US012242818B2

United States Patent
Chan et al.

(10) Patent No.: US 12,242,818 B2
(45) Date of Patent: Mar. 4, 2025

(54) SEQUENCE MODELING USING IMPUTATION

(71) Applicant: Google LLC, Mountain View, CA (US)

(72) Inventors: William Chan, Markham (CA); Chitwan Saharia, Toronto (CA); Geoffrey E. Hinton, Toronto (CA); Mohammad Norouzi, Richmond Hill (CA); Navdeep Jaitly, Mountain View, CA (US)

(73) Assignee: Google LLC, Mountain View, CA (US)

( * ) Notice: Subject to any disclaimer, the term of this patent is extended or adjusted under 35 U.S.C. 154(b) by 198 days.

(21) Appl. No.: 17/797,872

(22) PCT Filed: Feb. 8, 2021

(86) PCT No.: PCT/US2021/017131
§ 371 (c)(1),
(2) Date: Aug. 5, 2022

(87) PCT Pub. No.: WO2021/159103
PCT Pub. Date: Aug. 12, 2021

(65) Prior Publication Data
US 2023/0075716 A1 Mar. 9, 2023

Related U.S. Application Data

(60) Provisional application No. 63/009,970, filed on Apr. 14, 2020, provisional application No. 62/971,769, filed on Feb. 7, 2020.

(51) Int. Cl.
*G06F 40/47* (2020.01)
*G06F 40/284* (2020.01)

(52) U.S. Cl.
CPC ............ *G06F 40/47* (2020.01); *G06F 40/284* (2020.01)

(58) Field of Classification Search
CPC ........ G06F 40/47; G06F 40/284; G06F 40/40; G06N 3/045; G06N 3/047; G06N 3/084; G10L 15/063; G10L 15/16
See application file for complete search history.

(56) References Cited

U.S. PATENT DOCUMENTS

| 6,598,047 B1 * | 7/2003 | Russell | ................... G06F 16/30 707/999.005 |
| 2020/0372400 A1 * | 11/2020 | Carreira-Perpiñán | ........................ G06F 16/9027 |
| 2021/0319288 A1 * | 10/2021 | Wagner | ................. G06F 40/289 |

FOREIGN PATENT DOCUMENTS

| CN | 102227724 A | 10/2011 |
| CN | 107870902 A | 4/2018 |

OTHER PUBLICATIONS

Towards End-To-End Speech Recognition with Recurrent Neural Networks Alex Graves, Navdeep Jaitly Proceedings of the 31st International Conference on Machine Learning, PMLR 32(2):1764-1772, 2014. (Year: 2014).*

(Continued)

*Primary Examiner* — Fariba Sirjani
(74) *Attorney, Agent, or Firm* — Fish & Richardson P.C.

(57) ABSTRACT

Methods, systems, and apparatus, including computer programs encoded on computer storage media, for sequence modeling. One of the methods includes receiving an input sequence having a plurality of input positions; determining a plurality of blocks of consecutive input positions; processing the input sequence using a neural network to generate a latent alignment, comprising, at each of a plurality of input time steps: receiving a partial latent alignment from a previous input time step; selecting an input position in each block, wherein the token at the selected input position of the partial latent alignment in each block is a mask token; and processing the partial latent alignment and the input (Continued)

sequence using the neural network to generate a new latent alignment, wherein the new latent alignment comprises, at the selected input position in each block, an output token or a blank token; and generating, using the latent alignment, an output sequence.

23 Claims, 7 Drawing Sheets

(56) References Cited

OTHER PUBLICATIONS

Stern, Mitchell, et al. "Insertion transformer: Flexible sequence generation via insertion operations." International Conference on Machine Learning. PMLR, 2019. (Year: 2019).*
Vaswani, A., Shazeer, N., Parmar, N., Uszkoreit, J., Jones, L., Gomez, A. N., Kaiser, L., and Polosukhin, I. Attention Is All You Need. In NIPS, 2017. (Year: 2017).*
Towards End-to-End Speech Recognition with Deep Convolutional Neural Networks Ying Zhang, Mohammad Pezeshki, Philemon Brakel, Saizheng Zhang, Cesar Laurent Yoshua Bengio, Aaron Courville (Year: 2017).*
Jordan, Michael I. et al., "Hierarchical Mixture of Experts and the EM Algorithm", In Proceedings of International Joint Conference on Neural Networks, vol. 6, Issue 2, Mar. 1994, (Year: 1994).*
Blockwise Parallel Decoding for Deep Autoregressive Models Mitchell Stern, Noam Shazeer, Jakob Uszkoreit , Nov. 7, 2018. https://doi.org/10.48550/arXiv.1811.03115 (Year: 2018).*
Trevor Hastie , Jerome Friedman, Robert Tibshirani, The Elements of Statistical Learning Data Mining, Inference, and Prediction, Springer Series in Statistics (SSS), 2001. Chapter 9.5, pp. 329-332. (Year: 2001).*
Bahdanau et al., "Task Loss Estimation for Sequence Prediction," Presented at Proceedings of the 4th International Conference on Learning Representations, San Juan Puerto Rico, USA, May 2-4, 2016; CoRR, Submitted on Jan. 19, 2016, arXiv:1511.06456v4, 13 pages.
Bahdanau et al., "End-to-End Attention-based Large Vocabulary Speech Recognition," Presented at Proceedings of the International Conference on Acoustics, Speech, and Signal Processing, Shanghai, China, Mar. 20-25, 2016; CoRR, Submitted on Mar. 14, 2016, arXiv:1508.04395v2, 8 pages.
Bahdanau et al., "Neural Machine Translation by Jointly Learning to Align and Translate," Presented at Proceedings of the 3rd International Conference on Learning Representations, San Diego, CA, May 7-9, 2015; CoRR, Submitted on Apr. 24, 2015, arXiv:1409.0473v6, 15 pages.
Battenberg et al., "Exploring Neural Transducers for End-to-End Speech Recognition," Presented at Proceedings of the IEEE Automatic Speech Recognition and Understanding Workshop, Okinawa, Japan, Dec. 16-20, 2017; CoRR, Submitted on Jul. 24, 2017, arXiv:1707.07413v1, 8 pages.
Chan et al., "An Empirical Study of Generation Order for Machine Translation," CoRR, Submitted on Oct. 29, 2019, arXiv:1910.13437v1, 10 pages.
Chan et al., "Imputer: Sequence Modelling via Imputation and Dynamic Programming," CoRR, Submitted on Feb. 20, 2020, arXiv:2002.08926v1, 11 pages.
Chan et al., "KERMIT: Generative Insertion-Based Modeling for Sequences," CoRR, Submitted on Jun. 4, 2019, arXiv:1906.01604v1, 11 pages.
Chan et al., "Latent Sequence Decompositions," Presented at Proceedings of the 5th International Conference on Learning Representations, Toulon, France, Apr. 24-26, 2017, 12 pages.
Chan et al., "Listen, Attend and Spell: A Neural Network for Large Vocabulary Conversational Speech Recognition," Presented at Proceedings of the IEEE International Conference on Acoustics, Speech and Signal Processing, Shanghai, China, Mar. 20-25, 2016, pp. 4960-4964.
Chan et al., "Multilingual KERMIT: It's Not Easy Being Generative," Presented at NeurIPS 2019 Workshop on Perception as Generative Reasoning, Vancouver, Canada, Dec. 13, 2019, 8 pages.
Chen et al., "Non-Autoregressive Transformer Automatic Speech Recognition," CoRR, Submitted on Nov. 10, 2019, arXiv:1911.04908v1, 6 pages.
Chiu et al., "State-of-the-art Speech Recognition With Sequence-to-Sequence Models," Presented at Proceedings of the IEEE International Conference on Acoustics, Speech and Signal Processing, Calgary Canada, Apr. 15-20, 2018; CoRR, Submitted on Feb. 23, 2018, arXiv:1712.01769v6, 5 pages.
Cho et al., "Learning Phrase Representations using RNN Encoder-Decoder for Statistical Machine Translation," Presented at Proceedings of the 2014 Conference on Empirical Methods in Natural Language Processing, Doha, Qatar, Oct. 25-29, 2014, pp. 1724-1734.
Chorowski et al., "Towards Better Decoding and Language Model Integration in Sequence-to-Sequence Models," Presented at Proceedings of the Annual Conference of the International Speech Communication Association, Stockholm, Sweden, Aug. 20-24, 2017, pp. 523-527.
Collobert et al., "Wav2Letter: an End-to-End ConvNet-based Speech Recognition System," CoRR, Submitted on Sep. 11, 2016, arXiv:1609.03193v1, 8 pages.
Devlin et al., "BERT: Pre-training of Deep Bidirectional Transformers for Language Understanding," Presented at Proceedings of the 2019 Conference of the North American Chapter of the Association for Computational Linguistics: Human Language Technologies, Minneapolis, MN, Jun. 2-7, 2019, pp. 4171-4186.
Dong et al., "Speech-Transformer: A No-Recurrence Sequence-to-Sequence Model for Speech Recognition," Presented at Proceedings of the IEEE International Conference on Acoustics, Speech and Signal Processing, Calgary, Canada, Apr. 15-20, 2018, pp. 5884-5888.
Dyer et al., "A Simple, Fast, and Effective Reparameterization of IBM Model 2," Presented at Proceedings of NAACL-HLT, Atlanta, GA, Jun. 9-14, 2013, pp. 644-648.
Ghazvininejad et al., "Aligned Cross Entropy for Non-Autoregressive Machine Translation," CoRR, Submitted on Apr. 3, 2020, arXiv:2004.01655v1, 9 pages.
Ghazvininejad et al., "Mask-Predict: Parallel Decoding of Conditional Masked Language Models," Presented at Proceedings of the 2019 Conference on Empirical Methods in Natural Language Processing and the 9th International Joint Conference on Natural Language Processing (EMNLP-IJCNLP), Hong Kong, China, Nov. 3-7, 2019, pp. 6112-6121.
Ghazvininejad et al., "Semi-Autoregressive Training Improves Mask-Predict Decoding," CoRR, Submitted on Jan. 23, 2020, arXiv:2001.08785v1, 5 pages.
Graves et al., "Connectionist Temporal Classification: Labelling Unsegmented Sequence Data with Recurrent Neural Networks," Presented at Proceedings of the 23rd International Conference on Machine Learning, Pittsburgh, PA, Jun. 25-29, 2006, 8 pages.
Graves et al., "Speech Recognition with Deep Recurrent Neural Networks," Presented at Proceedings of the 31st International Conference on Machine Learning, Vancouver, Canada, May 26-31, 2013, 5 pages.
Graves, "Sequence Transduction with Recurrent Neural Networks," Presented at Proceedings of the 29th International Conference on Machine Learning, Representation Learning Workshop, Edinburgh, Scotland, Jul. 1, 2012; CoRR, Submitted on Nov. 14, 2012, arXiv:1211.3711v1, 9 pages.
Gu et al., "Insertion-based Decoding with Automatically Inferred Generation Order," CoRR, Submitted on Feb. 4, 2019, arXiv:1902.01370v1, 10 pages.
Gu et al., "Levenshtein Transformer," Presented at NeurIPS 2019, Vancouver, Canada, Dec. 8-14, 2019, 11 pages.
Gu et al., "Non-Autoregressive Neural Machine Translation," Presented at Proceedings of 6th International Conference on Learning

(56) References Cited

OTHER PUBLICATIONS

Representations, Vancouver, Canada, Apr. 30-May 3, 2018; CoRR, Submitted on Mar. 9, 2018, arXiv:1711.02281v2, 13 pages.
International Preliminary Report on Patentability in International Appln. No. PCT/US/2021/017131, dated Aug. 18, 2022, 8 pages.
International Search Report and Written Opinion in International Appln. No. PCT/US/2021/017131, dated Jun. 11, 2021, 14 pages.
Irie et al, "Model Unit Exploration for Sequence-to-Sequence Speech Recognition," CoRR, Submitted on Feb. 5, 2019, arXiv:1902.01955v1, 5 pages.
Kim et al., "Joint CTC-Attention based End-to-End Speech Recognition using Multi-task Learning," Presented at Proceedings of the International Conference on Acoustics, Speech, and Signal Processing, New Orleans, LA, Mar. 5-9, 2017; CoRR, Submitted on Jan. 31, 2017, arXiv:1609.06773v2, 5 pages.
Kingma et al., "Adam: A Method for Stochastic Optimization," Presented at Proceedings of 3rd International Conference on Learning Representations, San Diego CA, May 7-9, 2015; CoRR, Submitted on Jul. 20, 2015, arXiv:1412.6980v7, 13 pages.
Kudo et al., "SentencePiece: A Simple and Language Independent Subword Tokenizer and Detokenizer for Neural Text Processing," Presented at Proceedings of the Conference on Empirical Methods in Natural Language Processing, Brussels, Belgium, Oct. 31-Nov. 4, 2018, pp. 66-71.
Lee et al., "Deterministic Non-Autoregressive Neural Sequence Modeling by Iterative Refinement," Presented at Proceedings of the Conference on Empirical Methods in Natural Language Processing, Brussels, Belgium, Oct. 31-Nov. 4, 2018, 11 pages.
Li et al., "Big Bidirectional Insertion Representations for Documents," Presented at 3rd Workshop on Neural Generation and Translation, Conference on Empirical Methods in Natural Language Processing, Hong Kong, China, Nov. 4, 2019, pp. 194-198.
Li et al., "Hint-Based Training for Non-Autoregressive Machine Translation," Presented at Proceedings of the Conference on Empirical Methods in Natural Language Processing and the 9th International Joint Conference on Natural Language Processing (EMNLP-IJCNLP), Hong Kong, China, Nov. 3-7, 2019, pp. 5708-5713.
Li et al., "Jasper: An End-to-End Convolutional Neural Acoustic Model," Presented at Annual Conference of the International Speech Communication Association, Graz, Austria, Sep. 15-19, 2019, pp. 71-75.
Libovicky et al., "End-to-End Non-Autoregressive Neural Machine Translation with Connectionist Temporal Classification," Presented at Proceedings of the Conference on Empirical Methods in Natural Language Processing, Brussels, Belgium, Oct. 31-Nov. 4, 2018, pp. 3016-3021.
Liptchinsky et al., "Letter-Based Speech Recognition with Gated ConvNets," CoRR, Submitted on Dec. 22, 2017, arXiv:1712.09444v1, 13 pages.
Liu et al., "Gram-CTC: Automatic Unit Selection and Target Decomposition for Sequence Labelling," Presented at Proceedings of the 34th International Conference on Machine Learning, Sydney, Australia, Aug. 6-11, 2017, 10 pages.
Luo et al., "Learning Online Alignments with Continuous Rewards Policy Gradient," Presented at Proceedings of the IEEE International Conference on Acoustics, Speech, and Signal Processing, Shanghai, China, Mar. 20-25, 2016; CoRR, Submitted on Aug. 3, 2016, arXiv:1608.01281v1, 9 pages.
Luong et al., "Effective Approaches to Attention-based Neural Machine Translation," Presented at Proceedings of the 2015 Conference on Empirical Methods in Natural Language Processing, Lisbon, Portugal, Sep. 17-21, 2015, pp. 1412-1421.
Luscher et al., "RWTH ASR Systems for LibriSpeech: Hybrid vs Attention—w/o Data Augmentation," Presented at Proceedings of the Annual Conference of the International Speech Communication Association, Austria, Graz, Sep. 15-19, 2019; CoRR, Submitted on Jul. 25, 2019, arXiv:1905.03072v3, 5 pages.
Ma et al., "FlowSeq: Non-Autoregressive Conditional Sequence Generation with Generative Flow," Presented at Proceedings of the Conference on Empirical Methods in Natural Language Processing and the 9th International Joint Conference on Natural Language Processing (EMNLP-IJCNLP), Hong Kong, China, Nov. 3-7, 2019, pp. 4282-4292.
Neubig et al., "compare-mt: A Tool for Holistic Comparison of Language Generation Systems," CoRR, Submitted on Mar. 19, 2019, arXiv:1903.07926v1, 11 pages.
Oord et al., "Parallel WaveNet: Fast High-FidelitySpeech Synthesis," Presented at Proceedings of the 35th International Conference on Machine Learning, Stockholm, Sweden, Jul. 10-15, 2018, 9 pages.
Oord et al., "WaveNet: A Generative Model for Raw Audio," CoRR, Submitted on Sep. 12, 2016, arXiv:1609.03499v1, 15 pages.
Panayotov et al., "Librispeech: An ASR Corpus Based on Public Domain Audio Books," Presented at Proceedings of the IEEE International Conference on Acoustics, Speech and Signal Processing, South Brisbane, Australia, Apr. 19-24, 2015, 5 pages.
Papineni et al., "BLEU: a Method for Automatic Evaluation of Machine Translation," Presented at Proceedings of the 40th Annual Meeting of the Association for Computational Linguistics, Philadelphia, PA, Jul. 7-12, 2002, pp. 311-318.
Park et al., "SpecAugment: A Simple Data Augmentation Method for Automatic Speech Recognition," Presented at Proceedings of the Annual Conference of the International Speech Communication Association, Austria, Graz, Sep. 15-19, 2019; pp. 2613-2617.
Paul et al., "The Design for the Wall Street Journal-based CSR Corpus," Presented at Speech and Natural Language: Proceedings of a Workshop, Harriman NY, Feb. 23-26, 1992, pp. 357-362.
Povey et al., "The Kaldi Speech Recognition Toolkit," Presented at IEEE 2011 Workshop on Automatic Speech Recognition and Understanding, Hawaii, Dec. 11-15, 2011, 4 pages.
Prabhavalkar et al., "A Comparison of Sequence-to-Sequence Models for Speech Recognition," Presented at Proceedings of the Annual Conference of the International Speech Communication Association, Stockholm, Sweden, Aug. 20-24, 2017, pp. 939-943.
Ruis et al., "Insertion-Deletion Transformer," Presented at the Proceedings of the 3rd Workshop on Neural Generation and Translation, Conference on Empirical Methods in Natural Language Processing, Hong Kong, China, Nov. 4, 2019; CoRR, Submitted on Jan. 15, 2020, arXiv:2001.05540, 5 pages.
Sabour et al., "Optimal Completion Distillation for Sequence Learning," Presented at Proceedings of the 7th International Conference on Learning Representations, New Orleans LA, May 6-9, 2019, 16 pages.
Sainath et al., "Deep Convolutional Neural Networks for LVCSR," Presented at Proceedings of International Conference on Acoustics, Speech, and Signal Processing, Vancouver, Canada, May 26-31, 2013, 5 pages.
Serdyuk et al., "Twin Networks: Matching the Future for Sequence Generation," Presented at Proceedings of the 6th International Conference on Learning Representations, Vancouver, Canada, Apr. 30-May 3, 2018; CoRR, Submitted on Feb. 23, 2018, arXiv:1708.06742v3, 12 pages.
Shao et al., "Minimizing the Bag-of-Ngrams Difference for Non-Autoregressive Neural Machine Translation," Presented at Proceedings of the 34th AAAI Conference on Artficial Intelligence, New York, NY, Feb. 7-12, 2020, pp. 198-205.
Sun et al., "Fast Structured Decoding for Sequence Models," Presented at NeurIPS 2019, Vancouver, Canada, Dec. 8-14, 2019, 11 pages.
Sutskever et al., "Sequence to Sequence Learning with Neural Networks," Presented at NeurIPS 2014, Montreal, Canada, Dec. 8-13, 2014, 9 pages.
Synnaeve et al., "End-to-end ASR: from Supervised to Semi-Supervised Learning with Modem Architectures," CoRR, Submitted on Nov. 19, 2019, arXiv:1911.08460v1, 7 pages.
Tjandra et al., "Sequence-to-Sequence ASR Optimization via Reinforcement Learning," Presented at Proceedings of the IEEE International Conference on Acoustics, Speech and Signal Processing, Calgary Canada, Apr. 15-20, 2018; CoRR, Submitted on Feb. 28, 2018, arXiv:1710.10774v2, 5 pages.
Tüske et al., "Advancing Sequence-to-Sequence Based Speech Recognition," Presented at Proceedings of the Annual Conference

(56) References Cited

OTHER PUBLICATIONS of the International Speech Communication Association, Austria, Graz, Sep. 15-19, 2019, pp. 3780-3784.

Vaswani et al., "Tensor2Tensor for Neural Machine Translation," Proceedings of the AMTA 2018, Boston MA, Mar. 17-21, 2018, pp. 193-199.

Vinyals et al., "Show and Tell: A Neural Image Caption Generator," Presented at Proceedings of the IEEE Conference on Computer Vision and Pattern Recognition, Boston MA, Jun. 7-12, 2015, pp. 3156-3164.

Wang et al., "Non-Autoregressive Machine Translation with Auxiliary Regularization," Presented at Proceedings of the 33rd AAAI Conference on Artificial Intelligence, Honolulu, Hawaii, Jan. 27-Feb. 1, 2019, pp. 5377-5384.

Welleck et al., "Non-Monotonic Sequential Text Generation," Presented at Proceedings of the 36th International Conference on Machine Learning, Long Beach CA, Jun. 9-15, 2019, 11 pages.

Wu et al., "Google's Neural Machine Translation System: Bridging the Gap between Human and Machine Translation," CoRR, Submitted on Oct. 8, 2016, arXiv:1609.08144v2, 23 pages.

Xu et al., "Show, Attend and Tell: Neural Image Caption Generation with Visual Attention," Presented at Proceedings of the 32nd International Conference on Machine Learning, Lille, France, Jul. 6-11, 2015, 10 pages.

Zeyer et al., "A Comprehensive Analysis on Attention Models," Presented at NeurIPS 2018, Montreal, Canada, Dec. 3-8, 2018, 12 pages.

Zeyer et al., "Improved Training of End-to-End Attention Models for Speech Recognition," Presented at Proceedings of the Annual Conference of the International Speech Communication Association, Hyderabad, India, Sep. 2-6, 2018, pp. 7-11.

Zhang et al., "Very Deep Convolutional Networks for End-to-End Speech Recognition," Presented at Proceedings of the IEEE International Conference on Acoustics, Speech, and Signal Processing, New Orleans, LA, Mar. 5-9, 2017; CoRR, Submitted on Oct. 10, 2016, arXiv:1610.03022v1, 5 pages.

Zhou et al., "Understanding Knowledge Distillation in Non-autoregressive Machine Translation," Presented at the 8th International Conference on Learning Representations, Addis Adaba, Ethiopia, Apr. 26-30, 2020, 17 pages.

Office Action in Chinese Appln. No. 202180012954.2, mailed on Nov. 26, 2024, 19 pages (with English translation).

\* cited by examiner

202

| ∅ | ∅ | ∅ | ∅ | ∅ | ∅ | ∅ | ∅ | ∅ | ∅ | ∅ | ∅ |

204

| A | ∅ | ∅ | ∅ | _ | ∅ | ∅ | ∅ | ∅ | ∅ | ∅ | F |

206

| A | ∅ | _ | ∅ | _ | ∅ | ∅ | E | _ | ∅ | ∅ | F |

208

| A | B | _ | ∅ | _ | ∅ | D | E | _ | ∅ | _ | F |

210

| A | B | _ | C | _ | _ | D | E | _ | _ | _ | F |

FIG. 2A

SEQUENCE MODELING USING IMPUTATION

CROSS-REFERENCE TO RELATED APPLICATIONS

This application is a National Stage application under 35 U.S.C. § 371 of International Application No. PCT/US2021/017131, filed Feb. 8, 2021, which claims priority to U.S. Patent Application Ser. No. 62/971,769, filed Feb. 7, 2020, and to U.S. Patent Application Ser. No. 63/009,970, filed Apr. 14, 2020, the entirety of which are hereby incorporated by reference.

BACKGROUND

This specification relates to generating sequential data using neural networks.

Neural networks are machine learning models that employ one or more layers of nonlinear units to predict an output for a received input. Some neural networks include one or more hidden layers in addition to an output layer. The output of each hidden layer is used as input to or more other layers in the network, i.e., one or more other hidden layers, the output layer, or both. Each layer of the network generates an output from a received input in accordance with current values of a respective set of parameters.

SUMMARY

This specification describes a system implemented as computer programs on one or more computers in one or more locations that receives an input sequence composed of a respective input token at each of multiple input positions and generates an output sequence composed of a respective output token at each of multiple output positions. The system can generate the output sequence by processing the input sequence using a neural network. This specification also describes techniques for training the neural network to generate output sequences.

The neural network can first generate a latent alignment between the input sequence and the output sequence, and then generate the output sequence from the latent alignment. The neural network can generate the output sequence in a fixed number of time steps by segmenting the input sequence into multiple blocks of the same size B and, at each time step, generating a respective new element in the latent alignment for each block. Thus, the neural network can generate the latent alignment in exactly B time steps no matter the length of the input sequence, and then generate the output sequence from the latent alignment.

The subject matter described in this specification can be implemented in particular embodiments so as to realize one or more of the following advantages.

A system as described in this specification can generate output sequences faster than some existing systems that rely on auto-regressive neural networks. In particular, a system as described in this specification can generate an output sequence in a fixed, constant number of time steps. This guaranteed efficiency can be critical for use cases that require an output quickly, regardless of the size of the input. In this way, systems described in this specification permit real-time operation in real-world systems. For example, an on-device speech recognition system, e.g., a system operating on a mobile device of a user, might need to respond to a user in real time, e.g., by receiving an input audio sequence spoken by the user that includes a question, generating an output text sequence of the question asked by the user, and determining an answer for the user. As another example, a machine translation system might need to receive an input text sequence in a first language and generate an output text sequence in a second language in real-time in order to facilitate communication between two users who speak different languages. More generally, the features of various systems described in this specification result from technical considerations relating to achieving real-time operation in real-world systems.

A system as described in this specification can generate more accurate output sequences than some existing sequences that rely on non-auto-regressive neural networks, because it does not rely on conditional independence assumptions between output tokens. In particular, some systems described in this specification marginalize over all possible alignments and generation orders, making the systems well-suited for problems with natural latent monotonic alignments.

A system as described in this specification is not constrained to generate output sequences left-to-right, but rather is able to model language with bidirectional contextualization and both local and global conditional dependencies.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 2A-2C are illustrations of example partial latent alignments between an input sequence and an output sequence.

Like reference numbers and designations in the various drawings indicate like elements.

DETAILED DESCRIPTION

This specification describes a system that processes an input sequence to generate an output sequence.

Figure 1:
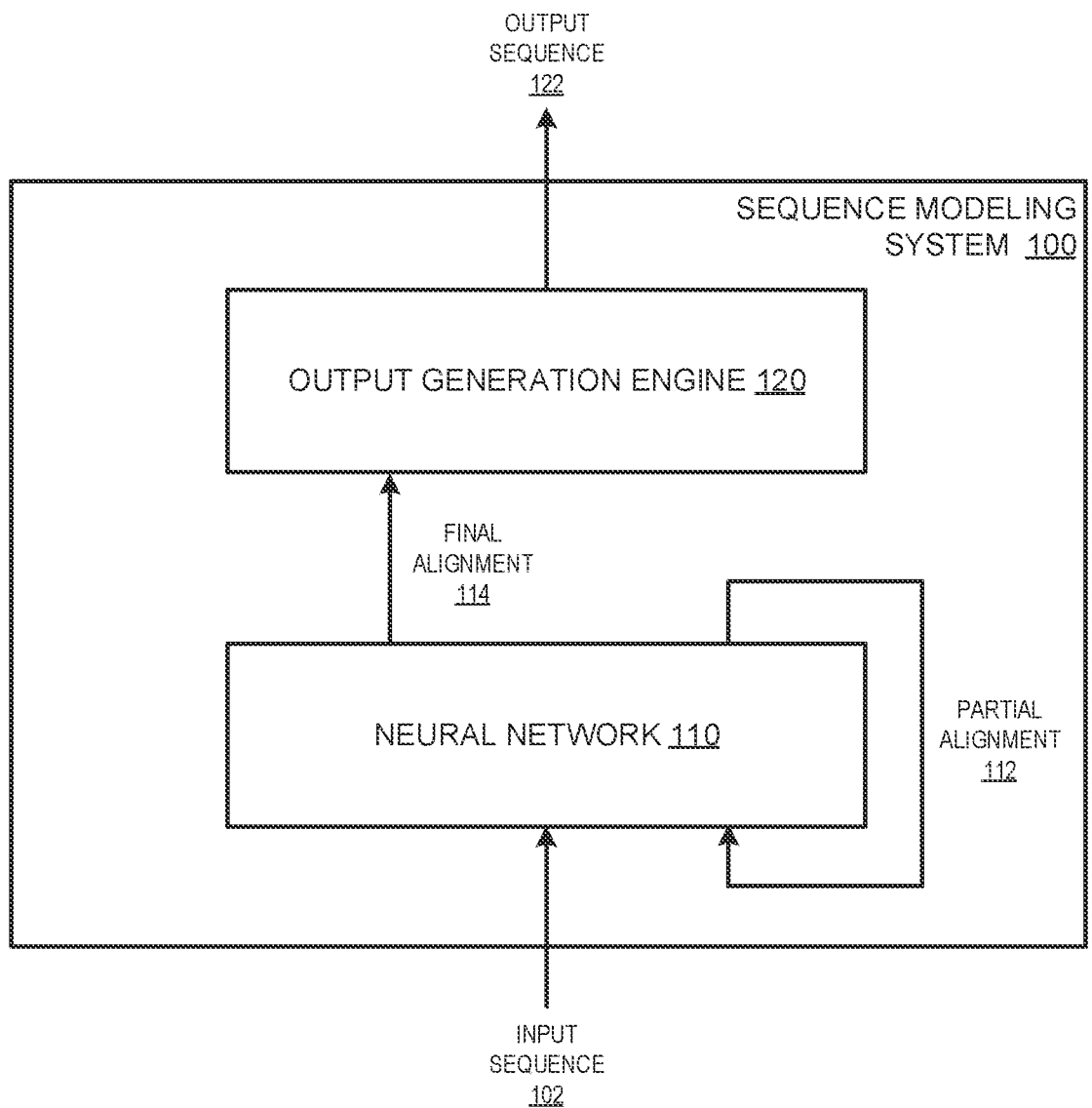
FIG. 1 is a diagram of an example sequence modeling system.

FIG. 1 is a diagram of an example sequence modeling system 100. The sequence modeling system 100 is an example of a system implemented as computer programs on one or more computers in one or more locations, in which the systems, components, and techniques described below can be implemented. The sequence modeling system 100 includes a neural network 110 and an output generation engine 120.

The sequence modeling system 100 is configured to obtain an input sequence 102 and to generate an output sequence 122. The input sequence 102 includes a respective input token at each of multiple input positions, and the output sequence 122 includes a respective output token at each of multiple output positions.

The input tokens of the input sequence 102 and the output tokens of the output sequence 122 can be of any appropriate type. In some implementations, the input tokens and the output tokens are of different types. In some other implementations, the input tokens and the output tokens are of the same type.

For example, the input tokens and/or the output tokens can represent text; for example, each token can represent a character, phoneme, or word. As another example, the input tokens and/or the output tokens can represent audio data; for example, each token can represent a raw, compressed, or companded amplitude value of an audio wave. As another example, the input tokens and/or the output tokens can represent sensor data captured by a sensor in an environment at respective time points. As another example, the input tokens and/or the output tokens can represent embeddings of a state of an environment at respective time points. As another example, the input tokens and/or the output tokens can represent actions to be taken by a robot interacting with an environment.

As a particular example, the input tokens can represent audio samples and the output tokens can represent text samples; that is, the neural network 110 can be configured through training to perform speech recognition. As another particular example, the input tokens can represent text samples and the output tokens can represent audio samples; that is, the neural network 110 can be configured through training to perform speech synthesis. As another particular example, the input tokens can represent text samples in a first language and the output tokens can represent text samples in a second language; that is, the neural network 110 can be configured through training to perform machine translation. As another particular example, the input tokens can represent text samples from a document and text samples representing a question about the document, and the output tokens can represent text samples characterizing an answer to the question; that is, the neural network 110 can be configured through training to perform question answering. As another particular example, the input tokens can represent text samples from a document and the output tokens can represent text samples characterizing a summary of the document; that is, the neural network 110 can be configured through training to perform text summarization.

As another example, the input sequence 102 and/or the output sequence 122 can represent an image. For example, each token in the sequence can represent a respective pixel of the image; i.e., the sequence can be a "flattened" version of the image. As a particular example, the input sequence 102 can represent an image and the output sequence 122 can represent text that describes the image. As another particular example, the input sequence 102 can represent a first image and the output sequence 122 can represent a second image that is a transformed version of the first image. For example, the sequence modeling system 100 can be configured to process an input sequence 102 representing a first image that includes artifacts (e.g., noise or low-resolution) and generate an output sequence 122 representing a second image characterizes the first image without the artifacts. As another example, the sequence modeling system 100 can be configured to process an input sequence 102 representing a black-and-white image and generate an output sequence 122 representing a colorized version of the black-and-white image. As another example, the sequence modeling system 100 can be configured to process an input sequence 102 representing a first image from a first domain and generate an output sequence 122 representing a second image in a second domain; e.g., the first image can depict a simulated environment and the second image can depict a real-world environment, or vice versa.

The input sequence 102 can also be called the input sequence $x=\{x_0, x_1, \ldots, x_{N-1}\}$, and the output sequence 122 can also be called the output sequence $y=\{y_0, y_1, \ldots, y_{M-1}\}$.

The neural network 110 is configured to process, at a first time step, the input sequence 102 and to generate a partial latent alignment 112. Then, at each of multiple subsequent time steps, the neural network 110 processes the input sequence 102 and the partial latent alignment 112 generated at the previous time step to generate a new partial latent alignment 112. Then, at a final time step, the neural network 110 processes the input sequence 102 and the previous partial latent alignment 112 to generate a final latent alignment.

A latent alignment, or simply an "alignment," between an input sequence and an output sequence is a mapping between the input tokens of the input sequence and the output tokens of the output sequence. Each input token can be mapped to an output token such that each output token has at least one input token that maps to the output token. A partial latent alignment between an input sequence and an output sequence is a partial mapping between the input tokens of the input sequence and the output tokens of the output sequence. That is, some of the input tokens of the input sequence can be mapped to respective output tokens, while the remaining input tokens of the input sequence are not yet mapped to respective output tokens.

In some implementations, there exists a monotonic latent alignment between the input tokens of the input sequence 102 and the output tokens of the output sequence 122. A monotonic latent alignment exists between input tokens and output tokens if each input token can be mapped to a respective output token such that there does not exist an input token $x_i$ mapped to an output token $y_i$ and an input token $x_j$ mapped to an output token $y_j$ such that $x_i$ is earlier in the input sequence than $x_j$ and $y_i$ is later in the output sequence than $y_j$. That is, if input token $x_i$ maps output token $y_i$, then the following input token $x_{i+1}$ must either map to the same output token $y_i$ or to the following output token $y_{i+1}$. Note that multiple input tokens can be mapped to the same output token, so that $|y| \leq |x|$, i.e., $M \leq N$. In other words, for any token at any given position in the input sequence, the corresponding output token in the latent alignment is not earlier in the output sequence than the output token corresponding to any tokens at positions after the given position in the input sequence.

The partial latent alignments 112 and the final latent alignment 114 can be any data that represents the mapping (partial or full, respectively) between the input tokens of the input sequence 102 and the output tokens of the output sequence 112.

For example, if $y_i \in V$, where V is a vocabulary of the output sequence 122, then there can exist a monotonic final latent alignment $a=\{a_0, a_1, \ldots, a_{N-1}\}$ between the input sequence 102 and the output sequence 122 such that $|a|=|x|$, where $a_i \in V^+$, $V^+=V \cap \{"\_"\}$, and where "_" is a special token called the "blank token." The blank token helps align the input sequence 102 with the output sequence 122 if multiple input tokens map to the same output token in the alignment a. In this specification, elements of V can also be called "vocabulary tokens." That is, each token in a monotonic latent alignment a is either a blank token or a vocabulary token.

For each input token in the input sequence 102 that corresponds to a blank token in the final latent alignment 114, the blank token identifies that the input token maps to the same output token as the previous input token in the input sequence 102 (i.e., the most recent input token that does not correspond to a blank token in the final latent alignment 114). For example, if the system is configured to perform speech recognition, then three input audio samples of the input sequence 102 might map to the output token "MY." In this case, the token in the final latent alignment 114 corresponding to the first of the three input audio samples can be "MY," while the two tokens in the final latent alignment 114 corresponding to the other two of the three input audio samples can be the blank token.

Before the first time step of the neural network 110, the sequence modeling system 100 can generate an initial partial latent alignment 112 that is the same size as the input sequence 102 and is composed entirely of "mask" tokens. A mask token is a token of a partial latent alignment that signifies that the corresponding token in the final latent alignment 114 has not been selected yet. Thus, each token in a partial latent alignment is either a mask token or, if it has already been selected, either a blank token or a vocabulary token. Then, at each time step, the neural network can process i) the input sequence 102 and ii) the current partial latent alignment 112 to generate one or more new tokens (e.g., either a vocabulary token or a blank token) to replace respective mask tokens in the partial latent alignment 112. That is, at each time step, the neural network 110 generates a new partial latent alignment 112 that has fewer mask tokens.

For example, the neural network 110 can process the input sequence 102 to generate an embedding of the input sequence 102, and the partial latent alignment 112 to generate an embedding of the partial latent alignment 112. The neural network 110 can then process the two embeddings to generate an updated partial latent alignment 112. An example network architecture for the neural network 110 is discussed in more detail below with reference to FIG. 4.

In some implementations, the neural network 110 generates a fixed number of new tokens in the partial latent alignment 112 at each time step of the neural network 110. For example, the neural network 110 can segment the partial latent alignment 114 into blocks of a fixed size B, where each block is composed of B consecutive tokens in the partial latent alignment 114 and each token is in exactly one block. Then, at each time step, the neural network 110 can generate a respective new token in each block. That is, at each time step, the neural network 110 can select one token in each block that is a mask token, and select either a vocabulary token or a blank token to replace the selected token, generating a new partial latent alignment 112.

In this example, the final latent alignment 114 is guaranteed to be generated in a fixed amount of time, equal to B time steps. That is, the amount of time to generate the final latent alignment 114 is constant with respect to the length of the input sequence 102. This efficiency can be an advantage over some existing systems that use auto-regressive neural networks, because the runtime of auto-regressive neural networks generally increases, e.g., increases linearly, with the size of the input sequence 102.

However, by generating the final latent alignment 114 across multiple steps and conditioning each step on the most recent partial latent alignment 112, the neural network 110 avoids making conditional independence assumptions about the output tokens of the output sequence. In many existing non-auto-regressive systems, the system assumes that the output tokens in the output sequence are each independent of each other, and generates the output sequence in a single time step. Such conditional independence assumptions can lead to poor performance in the existing systems because the output tokens are not actually independent. The neural network 110 depicted in FIG. 1 uses the tokens in the partial latent alignment 112 generated at previous time steps to update the partial latent alignment 112; that is, the new tokens in the partial latent alignment 112 are dependent on the old tokens in the partial latent alignment 112. Thus, the neural network 110 can generate a final latent alignment 114 in a fixed amount of time without relying on faulty conditional independence assumptions.

After generating the final latent alignment 114, the neural network 110 can provide the final latent alignment 114 to the output generation engine 120. The output generation engine 120 is configured to process the final latent alignment 114 to generate the output sequence 122. In some implementations, the output generation engine 120 merely removes the blank tokens from the latent alignment 114 to generate the output sequence 122. In some implementations, the subsystem also removes repeated vocabulary tokens; that is, if the latent alignment 114 includes two or more of the same vocabulary token in a row (in some implementations, even if they are separated by one or more blank tokens), then the output generation engine 120 can generate an output sequence 122 that only includes a single copy of the vocabulary token at the corresponding location in the output sequence 122.

In some implementations, the sequence modeling system 100 can generate the output sequence 122 from the input sequence 102 even if there does not exist a monotonic latent alignment between the input sequence 102 and the output sequence 122.

For example, the sequence modeling system 100 can generate the output sequence 122 by augmenting or modifying the input sequence 102 to generate a modified input sequence that does satisfy the monotonic latent alignment properties. As another example, the sequence modeling system 100 can generate the output sequence 122 by first generating a modified output sequence that satisfies the monotonic latent alignment properties and then processing the modified output sequence to generate the output sequence 122.

As a particular example, e.g., in some machine translation use cases, the input sequence 102 might be shorter than the output sequence 122, i.e., the input sequence 102 might not satisfy the requirement that $|y| \le |x|$. In some implementations, the sequence modeling system 100 can upsample the input sequence 102 to generate a modified input sequence x' such that the modified input sequence is longer than the output sequence 122. In some such implementations, the system can upsample the input sequence by repeating each token in the input sequences times so that $|x'|=s \cdot |x|$. In some other implementations, each token in the input sequence x is represented as a vector of length d, so that the input sequence x can be represented as an input matrix $X \in \mathbb{R}^{|x| \times d}$. In these implementations, the input sequence can be upsampled by performing a linear transformation on the input matrix X to generate a modified input matrix $X' \in \mathbb{R}^{s|x| \times d}$. For example, $X'_{si:s(i+1)-1} = WX_i + b$, where $W \in \mathbb{R}^{s \times d \times d}$ and $b \in \mathbb{R}^{s \times d}$ are learnable parameters.

In some implementations, the sequence modeling system 100 can be configured to generate an output sequence 122 even if there does not exist a monotonic latent alignment between the input sequence 102 and the output sequence 122. As a particular example, e.g., in some machine translation use cases, the sequence modeling system 100 might receive an input sequence 102 for which there is no latent alignment that satisfies the monotonicity requirement with the corresponding output sequence 122. For example, there is typically word re-ordering when translating from a first language to a second language, so that the tokens of the input sequence 102 are not monotonically aligned with the tokens of the output sequence 122. In these implementations, the sequence modeling system 100 can still generate an output sequence 122 because the depth of the neural network 110 (which can include, e.g., a stack of Transformer self-attention layers) can allow the system 100 to automatically learn, through training, to reorder the input sequence 102 such that the output embeddings of the neural network 110 have an approximately monotonic alignment with the output sequence 112. This process is discussed in more detail below with reference to FIG. 4.

Figure 2A:
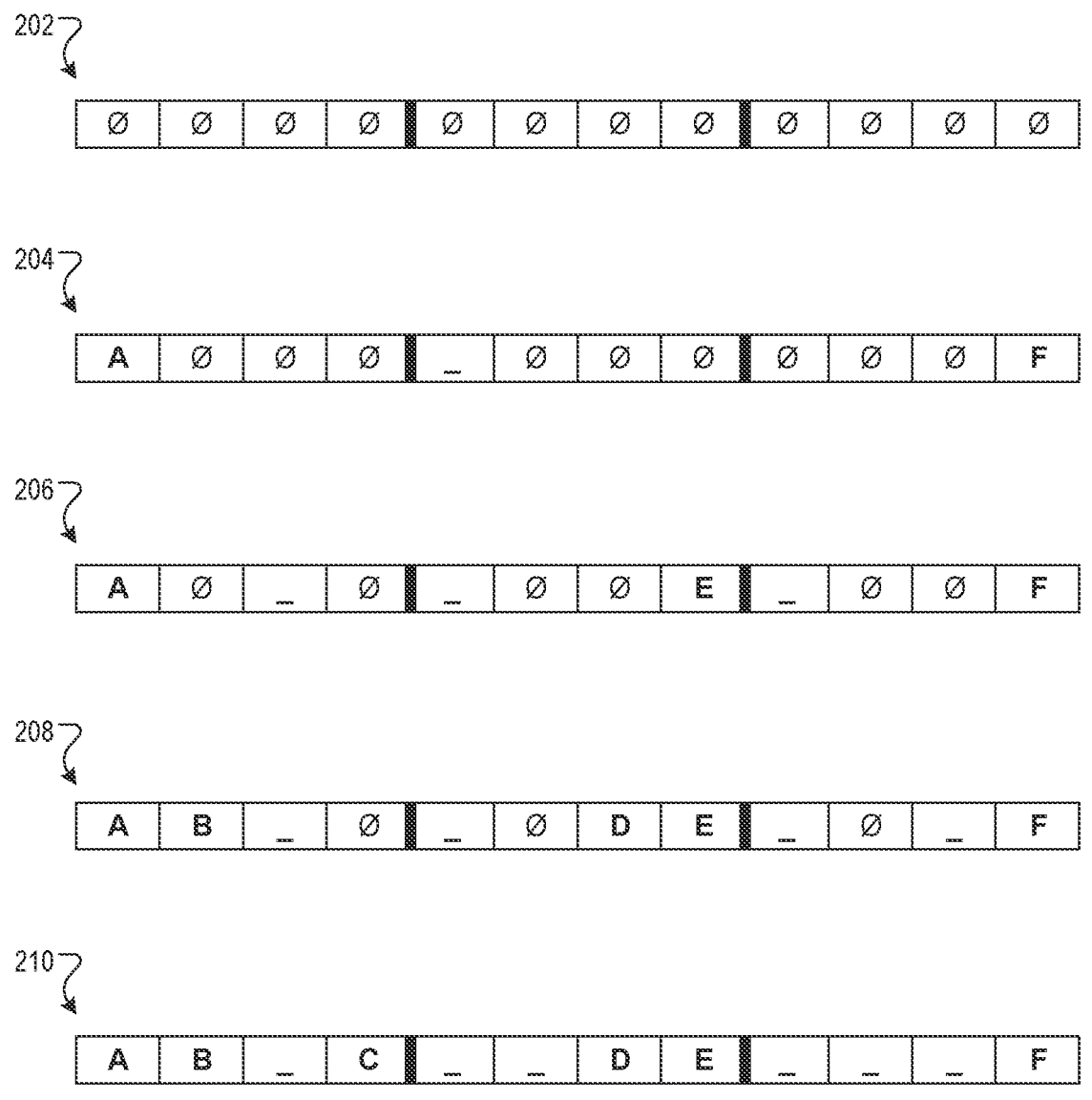
Figure 2B:
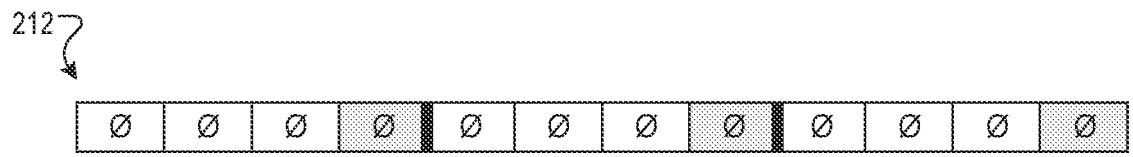
Figure 2B:
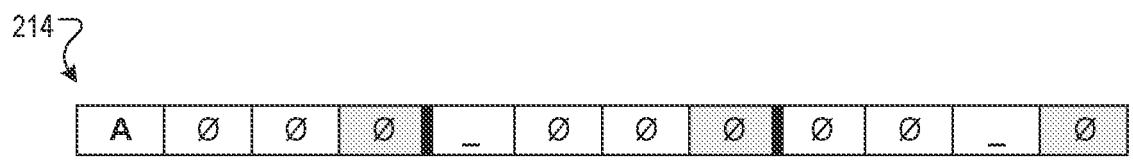
Figure 2B:
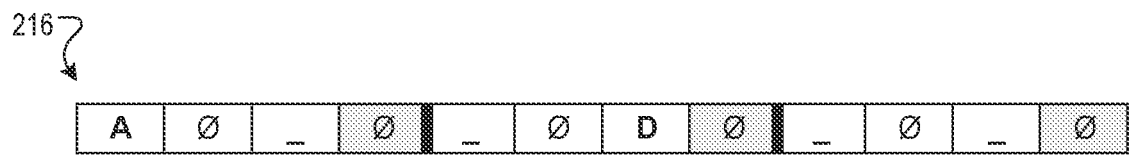
Figure 2B:
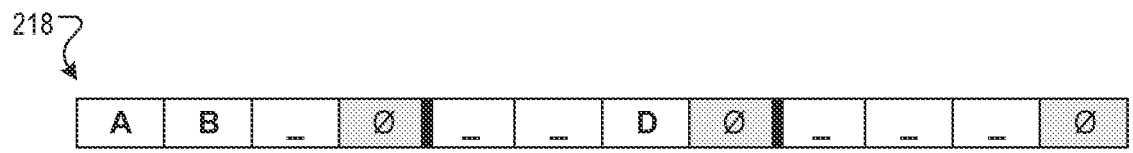
Figure 2B:
Figure 2C:
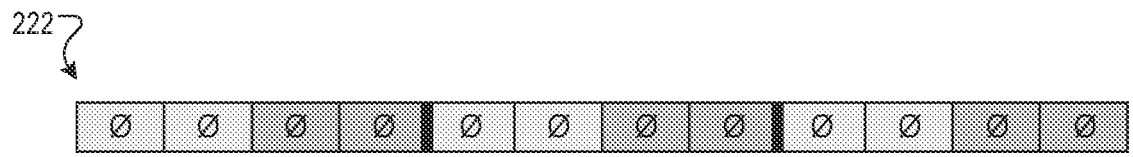
Figure 2C:
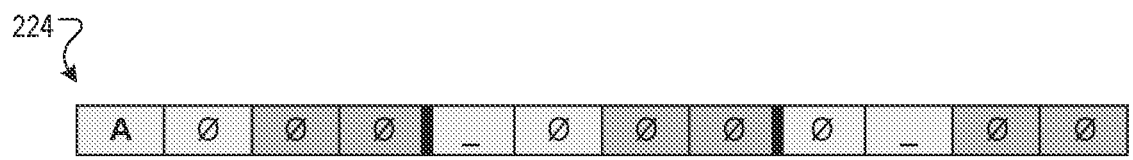
Figure 2C:
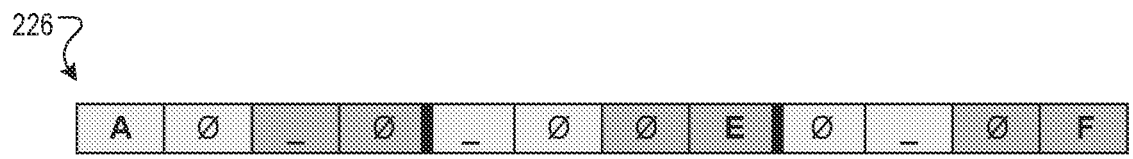
Figure 2C:
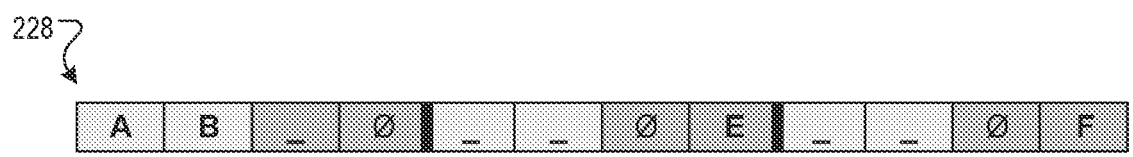
Figure 2C:
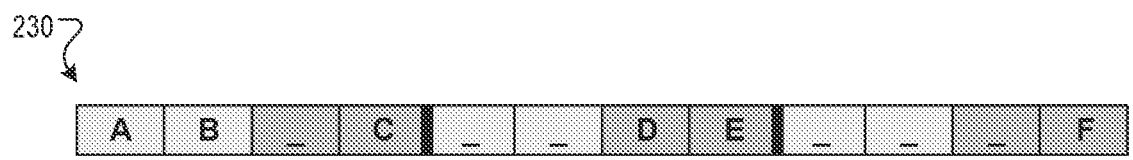

FIGS. 2A-2C are illustrations of example partial latent alignments between an input sequence and an output sequence. For example, the input sequence can represent audio data and the output sequence can represent corresponding text data. Each partial latent alignment can be generated by a neural network, e.g., the neural network 110 depicted in FIG. 1, at respective time steps, in response to processing the input sequence and a previous partial latent alignment.

Referring to FIG. 2A, each token in a first partial latent alignment 202 is the mask token. The first partial latent alignment can be an initial partial latent alignment, before the first time step (i.e., before the neural network processes the input sequence).

The first partial latent alignment 202 is segmented into blocks that each include four consecutive tokens. The blocks are delineated in FIG. 2A by bold lines. Although three blocks of four tokens are illustrated in FIG. 2A, generally a partial latent alignment can include many more blocks, which can each include any number of tokens. For example, each block can include 2, 4, 8, 16, 32, 64, 128, 256, or 512 tokens.

At each time step, the neural network can select a mask token in each block, and generate a new token (e.g., either a blank token or a vocabulary token) to replace the selected mask token.

A second partial latent alignment 204 is the output of the neural network after the first time step, i.e., the output of the neural network in response to processing the input sequence and the first partial latent alignment 202. For each block, the neural network has generated a new non-mask token. In particular, the neural network has generated an "A" token in the first block, a blank token in the second block, and an "F" token in the third block. Note that the neural network does not necessarily have to select the first token in each block; for example, the neural network selected the final token in the third block. Example processes for selecting a mask token in a block are discussed below with reference to FIG. 4 and FIG. 5.

A third partial latent alignment 206 is the output of the neural network after the second time step, i.e., the output of the neural network in response to processing the input sequence and the second partial latent alignment 204. In particular, the neural network has generated a blank token in the first block, an "E" token in the second block, and a blank token in the third block.

A fourth partial latent alignment 208 is the output of the neural network after the third time step, i.e., the output of the neural network in response to processing the input sequence and the third partial latent alignment 206. In particular, the neural network has generated a "B" token in the first block, a "D" token in the second block, and a blank token in the third block.

A fifth partial latent alignment 210 is the output of the neural network after the fourth time step, i.e., the output of the neural network in response to processing the input sequence and the fourth partial latent alignment 208. In particular, the neural network has generated a "C" token in the first block, a blank token in the second block, and a blank token in the third block.

The fifth partial latent alignment 210 is the final latent alignment, as each mask token of the first partial latent alignment 202 has been removed. A system, e.g., the output generation engine 120 depicted in FIG. 1, can process the fifth latent alignment 210 to generate the output sequence. For example, the system can remove each of the blank tokens from the fifth latent alignment 210 to generate the output sequence "ABCDEF."

Note that in the second time step (i.e., the time step at which the neural network generated the third partial latent alignment 206), the neural network generated two tokens that are neighboring in the third partial latent alignment 206. In particular, the neural network generated the final token in the second block (an "E" token) and the first token in the third block (a blank token). Generating consecutive tokens of a partial latent alignment in parallel can be uncommon, as only a single token per block is generated at each time step; however, this can occur when, as in this example, the neural network generates the final token in a first block and the first token in the following block.

By generating consecutive tokens of the partial latent alignment in parallel, the neural network is implicitly making a conditional independence assumption about the neighboring tokens. As previously discussed, this conditional independence assumption can be problematic, especially for neighboring tokens which a priori are highly dependent on each other. Thus, at each time step, the neural network can select tokens in each block in order to avoid generating consecutive tokens. Two strategies for doing so are depicted in FIG. 2B and FIG. 2C.

Referring to FIG. 2B, the neural network can reserve the final token in each block to be generated in the final time step. Thus, the neural network can avoid generating the final token in a first block and the first token in the subsequent block in parallel.

As a particular example, if the neural network is configured to select a mask token in each block that has the highest likelihood, of all mask tokens in the block, of being a respective vocabulary token or blank token (as described in more detail below with reference to FIG. 4), then the neural network can determine not to select the final token in the block; if the final token in a particular block has the highest likelihood, then the neural network can select the mask token with the second highest likelihood.

For example, in the first time step, the neural network can process a first partial latent alignment 212 composed entirely of mask tokens to generate a second partial latent alignment 214. In particular, the neural network (restricted to generating tokens for one of the first three positions in each block) can generate an "A" token in the first block, a blank token in the second block, and a blank token in the third block.

In the second time step, the neural network (again restricted to the first three positions in each block) can generate a third partial latent alignment 216 by generating a blank token in the first block, a "D" token in the second block, and a blank token in the third block.

In the third time step, the neural network (again restricted to the first three positions in each block) can generate a fourth partial latent alignment 218 by generating a "B" token in the first block, a blank token in the second block, and a blank token in the third block.

Finally, in the fourth time step, the neural network can generate the final token in each block to generate the final latent alignment 220. In particular, the neural network can generate a "C" token in the final position of the first block, and "E" token in the final position of the second block, and an "F" token in the final position of the third block.

Referring to FIG. 2C, in order to avoid generating the final token in a first block and the first token in the subsequent block in parallel, the neural network can segment each block into two sub-blocks. For each block, the first half of the tokens in the block can be in the first sub-block and the second half of the tokens in the block can be in the second sub-block. For each block, the first sub-block is depicted in FIG. 2C with a lighter shade of gray, while the second sub-block is depicted with a darker shade of gray.

The neural network can alternate between generating tokens in the first sub-block of each block and the second sub-block of each block. For example, the system can generate a token in the first sub-block of each block in odd time steps, and tokens in the second sub-block of each block in even time steps.

As a particular example, in the first time step, the neural network can process the first partial latent alignment 222 to generate the second partial latent alignment 224. The neural network is restricted to generating tokens in the first sub-block of each block. In particular, the neural network generates an "A" token in the first sub-block of the first block, a blank token in the first sub-block of the second block, and a blank token in the first sub-block of the third block.

In the second time step, the neural network can process the second partial latent alignment 224 to generate the third partial latent alignment 226. The neural network is restricted to generating tokens in the second sub-block of each block. In particular, the neural network generates a blank token in the second sub-block of the first block, an "E" token in the second sub-block of the second block, and an "F" token in the second sub-block of the third block.

In the third time step, the neural network can process the third partial latent alignment 226 to generate the fourth partial latent alignment 228. The neural network is again restricted to generating tokens in the first sub-block of each block. In particular, the neural network generates a "B" token in the first sub-block of the first block, a blank token in the first sub-block of the second block, and a blank token in the first sub-block of the third block.

In the fourth time step, the neural network can process the fourth partial latent alignment 228 to generate the final latent alignment 230. The neural network is again restricted to generating tokens in the second sub-block of each block. In particular, the neural network generates a "C" token in the second sub-block of the first block, an "D" token in the second sub-block of the second block, and a blank token in the second sub-block of the third block.

Figure 3:
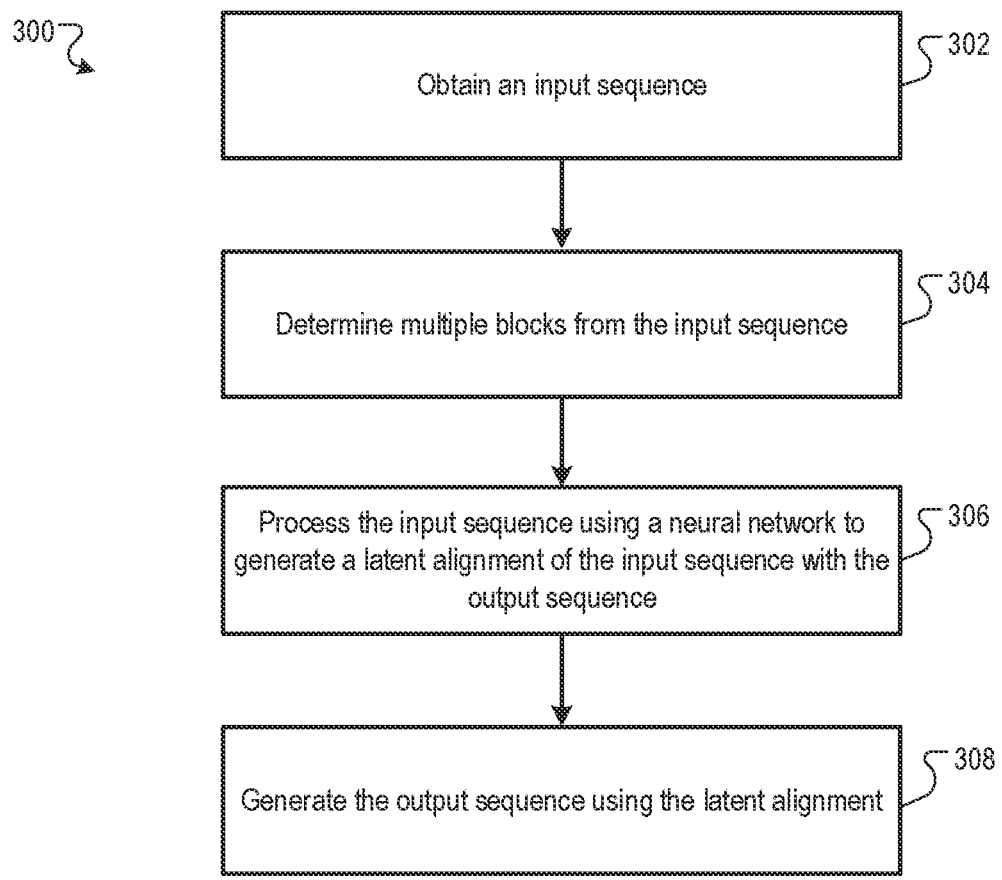
FIG. 3 is a flow diagram of an example process for processing an input sequence to generate an output sequence.

FIG. 3 is a flow diagram of an example process 300 for processing an input sequence to generate an output sequence. For convenience, the process 300 will be described as being performed by a system of one or more computers located in one or more locations. For example, a sequence modeling system, e.g., the sequence modeling system 100 depicted in FIG. 1, appropriately programmed in accordance with this specification, can perform the process 300.

The system obtains an input sequence that has a respective input token at each of multiple input positions (step 302). The output sequence includes a respective output token from a vocabulary of output tokens at each of multiple output positions.

The system determines multiple blocks from the input sequence (step 304). Each block inputs multiple consecutive input positions of the input sequence.

The system processes the input sequence using a neural network to generate a latent alignment of the input sequence (step 306). The latent alignment includes, at each of the input positions, either an output token from the vocabulary of output tokens or a blank token.

The processing can include, at each of multiple time steps, receiving a partial latent alignment from a previous input time step, where the partial latent alignment includes, at each of the input positions, one of: an output token, a blank token, or a mask token. The neural network can select an input position in each block, where the token at the selected input position of the partial latent alignment in each block is a mask token. The neural network can then process i) the partial latent alignment and ii) the input sequence to generate a new latent alignment, where the new latent alignment includes, at the selected input position in each block, an output token or a blank token.

The system generates the output sequence from the latent alignment (step 308). For example, the system can remove each blank token from the latent alignment to generate the output sequence.

Figure 4:
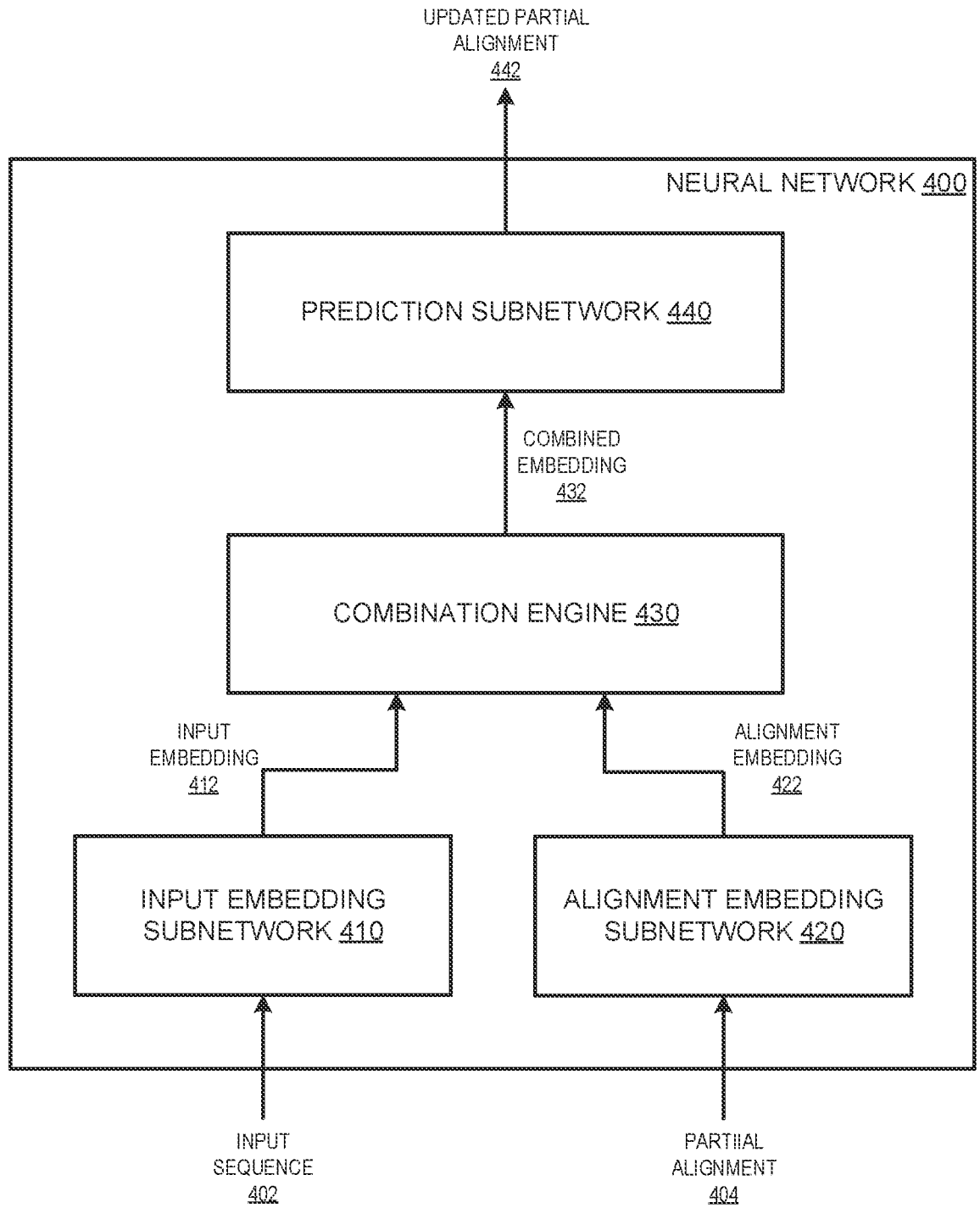
FIG. 4 is a diagram of an example neural network.

FIG. 4 is a diagram of an example neural network 400. The neural network is configured to process i) an input sequence 402 and ii) a partial latent alignment 404 and to generate an updated partial latent alignment 442. For example, the neural network 400 can be the neural network 110 depicted in FIG. 1.

The neural network 400 can generate a respective updated partial latent alignment 404 at each of multiple time steps. Before a first time step, the partial latent alignment 404 can be composed entirely of mask tokens. Then, at each time step, the neural network 400 can select one or more mask tokens in the partial latent alignment 404 and replace each selected mask token with either a vocabulary token or a blank token. At each time step, the neural network 400 can process the partial latent alignment generated at the previous time step. After the final time step, when each mask token in the partial latent alignment 404 has been replaced, the updated partial latent alignment 442 can be considered a final latent alignment. The final latent alignment can then be processed to generate an output sequence, e.g., using the output generation engine 120 depicted in FIG. 1.

The neural network 400 includes an input embedding subnetwork 410, an alignment embedding subnetwork 420, a combination engine 430, and a prediction subnetwork 440.

The input embedding subnetwork 410 is configured to process the input sequence 402 and to generate an embedding 412 of the input sequence 402. In this specification, an embedding is an ordered collection of numeric values that represents an input in a particular embedding space. For example, an embedding can be a vector of floating point or other numeric values that has a fixed dimensionality.

In some implementations, e.g., when the input sequence 402 is a sequence of audio samples, the input embedding subnetwork 410 can include one or more one-dimensional convolutional neural network layers. In some implementations in which the input sequence 402 is upsampled, as described above, the input embedding subnetwork 410 can first process the input sequence 402 to generate an initial input embedding, and then perform the upsampling on the initial input embedding to generate the input embedding 412. In some other implementations in which the input sequence 402 is upsampled, the input embedding subnetwork 410 can first upsample the input sequence 402 to generate an upsampled sequence (e.g., by repeating each token in the input sequence 402 p times), and then process the upsampled sequence to generate the input embedding 412.

Because the input sequence 402 does not change across the time steps of the neural network 400, in some implementations, the input embedding subnetwork 410 only processes the input sequence 402 once to generate the input embedding 412, and then at each subsequent time step the neural network 400 uses the same input embedding 412.

The alignment embedding subnetwork 420 is configured to process the partial latent alignment 404 and to generate an embedding 432 of the partial latent alignment 404. In some implementations, the alignment embedding subnetwork 420 can include one or more one-dimensional convolutional neural network layers.

The combination engine 430 is configured to obtain the input embedding 412 and the alignment embedding 422 and to combine the two embeddings to generate a combined embedding 432. In some implementations, the input embedding 412 and the alignment embedding 422 are the same size. For example, the combination engine 430 can determine the combined embedding 432 to be the sum of the input embedding 412 and the alignment embedding 422. As another example, the combination engine 430 can concatenate the input embedding 412 and the alignment embedding 422 to generate the combined embedding 432. As a particular example, the combination engine 430 can concatenate the two embeddings so that, for each token in the input sequence 402, the representation of the token in the input embedding 412 and the representation of the token in the alignment embedding 422 are concatenated. As another example, the combination engine 430 can process both the input embedding 412 and the alignment embedding 422 using a neural network, e.g., a multi-layer perceptron, to generate the combined embedding 432.

The prediction subnetwork 440 is configured to process the combined embedding 432 to generate the updated partial latent alignment 442.

For example, for each mask token in the partial latent alignment 404, the prediction subnetwork 440 can generate, for each vocabulary token in the vocabulary, a respective likelihood value that the mask token in the partial latent alignment 404 should be assigned the vocabulary token. Similarly, the prediction subnetwork 440 can generate a likelihood value that the mask token in the partial latent alignment 404 should be assigned the blank token. Then, the prediction subnetwork 440 can select one or more mask tokens in the partial latent alignment 404 to replace with corresponding vocabulary or blank tokens to generate the updated partial latent alignment 442. For example, for each selected mask token, the prediction subnetwork 440 can select the vocabulary token or blank token that has the highest corresponding likelihood value.

As a particular example, the neural network 400 can segment the partial latent alignment 404 into multiple blocks as described above. For each block, the prediction subnetwork 440 can determine, from all of the remaining mask tokens in the block, the particular mask token that has the single highest likelihood score for a respective vocabulary token or the blank token (i.e., the "arg max" mask token in the block). The prediction subnetwork 440 can then select the particular mask token, and the replace the particular mask token with the vocabulary token or blank token that has the highest likelihood score. In some implementations, the prediction subnetwork 440 performs these computations in parallel across all blocks.

As another particular example, the prediction subnetwork 440 can determine, from all of the remaining mask tokens across the entire partial latent alignment 404, the one or more particular mask tokens that have the single highest likelihood scores for respective vocabulary tokens or the blank token (i.e., the one or more "arg max" mask tokens). For example the prediction subnetwork 440 can select a fixed number of particular mask tokens at each time step, where the fixed number of particular mask tokens can depend on the length of the input sequence 402 to ensure that the output sequence is generated in a fixed number of time steps, as described above. The prediction subnetwork 440 can then select the particular mask tokens, and then replace the particular mask tokens with the respective vocabulary token or blank token that has the highest likelihood score. In other words, the neural network 400 can determine that the partial latent alignment 404 is a single block, and at each time step greedily select the one or more mask tokens that have the highest likelihood scores.

As another particular example, the prediction subnetwork 440 can select, for each block of the partial latent alignment 404, one or more remaining mask tokens at random. For example, the prediction subnetwork 440 can select a remaining mask token in each block uniformly at random. For each selected mask token, the prediction subnetwork 440 can then determine the vocabulary token or blank token that has the highest likelihood score.

In some implementations, the prediction subnetwork 440 can process the combined embedding 432 using a self-attention subnetwork. As a particular example, the self-attention subnetwork can include a stack of one or more Transformer self-attention layers (Vaswani et al., arXiv: 1706.03762). In the implementations in which the latent alignment between the input sequence 402 and the output sequence is not monotonic, as described above, the self-attention subnetwork can be trained to automatically reorder the representations of tokens in the combined embedding 432 to generate an updated combined embedding that has a monotonic latent alignment with the output sequence. That is, because each self-attention layer in the self-attention subnetwork processes the entire sequence generated by the previous layer (i.e., has full information about each element in the sequence), the self-attention subnetwork can learn to implicitly re-order the elements of the combined embedding 432 as required to generate the updated partial alignment 442.

The prediction subnetwork 440 can include a subnetwork (e.g., a subnetwork that includes a multi-layer perceptron and/or a softmax layer) that generates, for each mask token in the partial latent alignment 404, a probability distribution across possible vocabulary tokens (and the blank token) that could be assigned to the mask token.

In some implementations, the input embedding subnetwork 410, alignment embedding subnetwork 420, and prediction subnetwork 440 can be trained end-to-end. That is, a training system can backpropagate errors through each subnetwork, determining updates to the parameters of each subnetwork in parallel. This process is discussed in more detail below with reference to FIG. 5. In some other implementations, one or more of the subnetworks can be "frozen" while training the other subnetworks. That is, the system does not determine updates to the parameters of the "frozen" subnetworks during backpropagation.

In some implementations, the neural network 400 does not include one or more of the input embedding subnetwork 410 or the alignment embedding subnetwork 420. That is, the combination engine 430 can directly obtain the input sequence 402 and/or the partial latent alignment 404 to generate the combined embedding 432, as described above.

Figure 5:
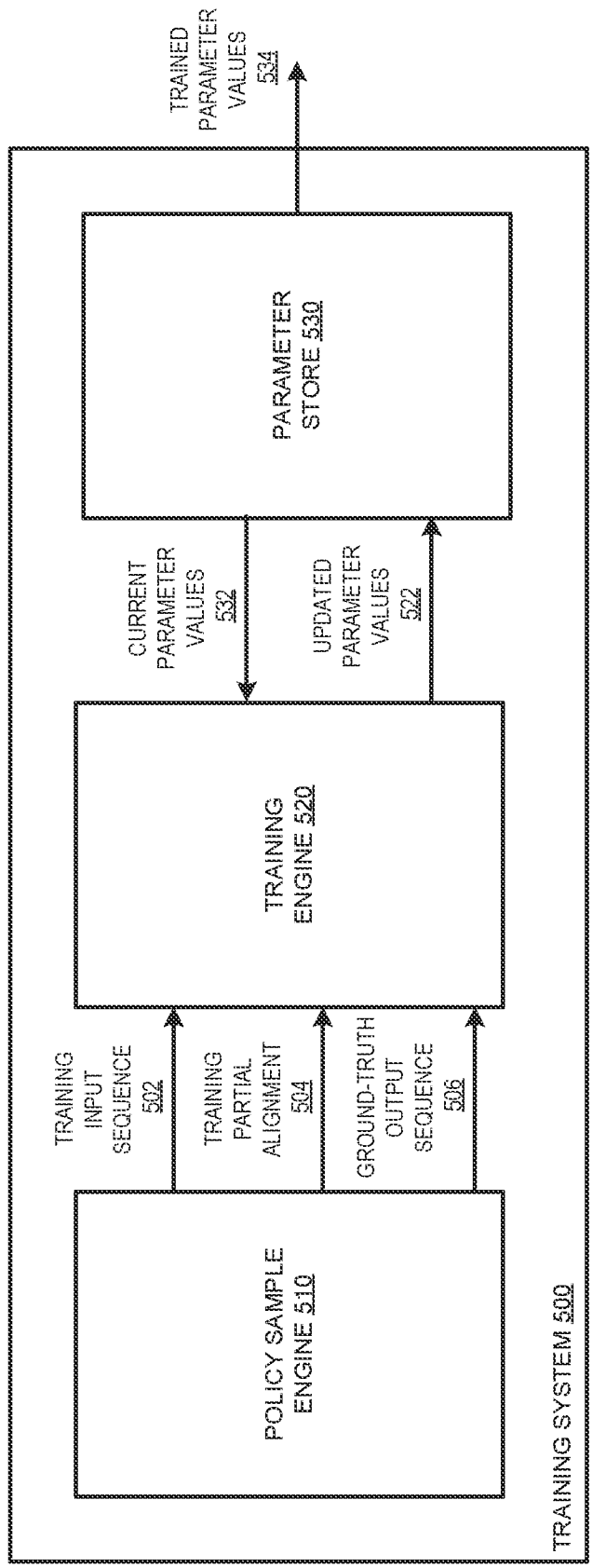
FIG. 5 is a diagram of an example training system.

FIG. 5 is a diagram of an example training system 500. The training system 500 is an example of a system implemented as computer programs on one or more computers in one or more locations in which the systems, components, and techniques described below are implemented.

The training system 500 is configured to train a neural network, e.g., the neural network 100 depicted in FIG. 1, to receive an input sequence and to process the input sequence to generate an output sequence. The training system 500 includes a policy sample engine 510, a training engine 520, and a parameter store 530.

The policy sample engine 510 is configured to generate training examples for training the neural network. Each training example can include i) a training input sequence 502, ii) a training partial latent alignment 504, and iii) a ground-truth output sequence 506. The ground-truth output sequence 506 represents the output that the neural network should generate in response to processing the training input sequence 502 and the training partial latent alignment 504.

In some implementations, the policy sample engine 510 samples training examples from an "expert" policy $\phi$. In particular, for a given input sequence 502 and ground-truth output sequence 506, the policy sample engine 510 can sample from a distribution $q_\phi$ over all possible latent alignments under the expert policy $\phi$. The expert policy can be a pre-trained model that is configured to perform the same task as the neural network, e.g. speech recognition or machine translation. As a particular example, the expert policy $\phi$ can be an auto-regressive neural network that performs well but takes excessive time to generate an output sequence at inference time.

In some implementations, the policy sample engine 510 does not sample directly from $q_\phi$, but rather from $q_{\phi'}$ of a different policy $\phi'$ that is generated from the expert policy $\phi$. The memory cost of computing the probabilities of each alignment under $\phi$ for every training example and storing them offline can be prohibitively expensive, and so using a more tractable $q_{\phi'}$ in its place can be a computationally feasible alternative.

In some implementations, the policy sample engine 510 generates $q_{\phi'}$ by first computing, for each (x, y) training example (where x represents a training input sequence 502 and y represents an example ground-truth output sequence 506), the empirical best alignment $\hat{a}^*_\phi$ of x under $\phi$, i.e., $$\hat{a}^*_\phi = \mathrm{argmax}_a q_\phi(a \mid x, y).$$

Using this expression, $\hat{a}^*_\phi$ can be computed efficiently and exactly using dynamic programming. The policy sample engine 510 can then determine $q_{\phi'}$ by adding a noise distribution N, i.e., $q_{\phi'} = \hat{a}^*_\phi + N$. As a particular example, N can randomly shift the alignment either left or right. As another particular example, N can randomly switch one or more pairs of tokens.

In some other implementations, the policy sample engine 510 sets $q_{\phi'}$ to be $q_{\theta'}$, where $q_{\theta'}$ is a stationary distribution created from a stale copy of the parameters of the neural network $\theta'$, e.g., the current parameter values 532 stored in the parameter store 530. That is, the policy sample engine 510 uses a stale version $\theta'$ its own neural network $\theta$ as the expert policy.

When sampling a training example (e.g., from $q_{\phi'}$ or $q_\phi$) to train the neural network, the policy sample engine 510 can "mask" certain tokens of the sampled latent alignment a to generate the training partial latent alignment 504. That is, the policy sample engine 510 can generate the training partial latent alignment 504 by selecting n tokens from each block of the sampled latent alignment a and replacing them with the mask token. This can be written as processing the sampled latent alignment a using a masking function $\tilde{a}=r(a)$. In some implementations, r(a) is a Bernoulli distribution or a Uniform distribution.

In some implementations, the policy sample engine 510 stores a set of $\hat{a}^*_\phi$ for respective x and y offline, and samples N on-the-fly during training of the neural network to generate new training partial alignments 504, which can be computationally quick and efficient. In some other implementations, the policy sample engine 510 generates each training partial alignment 504 before training.

The parameter store 530 is configured to store the current values 532 for the parameters of the neural network.

The training engine 520 is configured to execute training of the neural network, i.e., to determine updates to the parameters of the neural network. In particular, at each of multiple training time steps, the training engine 520 obtains i) a training input sequence 502, ii) a training partial alignment 504, and iii) the ground-truth output sequence 506 corresponding to the training input sequence 502 from the policy sample engine 510. The training engine 520 can also obtain the current values 532 of the parameters of the neural network from the parameter store 530.

The training engine 520 can then process the training input sequence 502 and the training partial alignment 504 to generate an updated partial alignment, as described above with reference to FIG. 1 and FIG. 4. The training engine 520 can then determine an update to the parameters of the neural network according to a difference between the updated partial alignment and the ground-truth output sequence 506. In some implementations, the training engine 520 only executes the neural network for one or a few time steps to generate an updated partial alignment that is still incomplete (i.e., still includes one or more mask tokens), and then determines the difference between the incomplete updated partial alignment and the ground-truth output sequence 506 (e.g., by ignoring the remaining mask tokens and comparing the vocabulary tokens in the updated partial alignment with corresponding tokens in the ground-truth output sequence 506). In some other implementations, the training engine 520 generates a final alignment (i.e., fully completes the training partial alignment 504), and then determines the difference between the final alignment and the output sequence 506 (e.g., by discarding the blank tokens in the final alignment and comparing the vocabulary tokens in the final alignment with the tokens in the ground-truth output sequence 506).

In some implementations, the training engine 520 can use imitation learning to imitate the expert policy $\phi'$. In some such implementations, the training engine 520 can use the following objective function:

$$J_{IM}(\theta) = E_{a \sim q_\phi}[E_{\tilde{a} \sim r}[\log p_\theta(a \mid \tilde{a}, x)]].$$

In some other implementations, the training engine 520 can use dynamic programming to compute an objective function. In some such implementations, the training engine 520 can use the following objective function:

$$J_{DP}(\theta) = E_{a \sim q_{\phi'}}\left[E_{\tilde{a} \sim r}\left[\log \sum_{a' \in \beta'(\tilde{a},a)} p_\theta(a' \mid \tilde{a}, x)\right]\right],$$

where $\beta'(\tilde{a}, a)$ returns a set of all possible new alignments compatible with $\tilde{a}$ drawn from the distribution $q_\phi \times r$. The inner log term can be computed exactly and efficiently via dynamic programming.

Once the objective function is computed, the training engine 520 can use backpropagation and stochastic gradient descent to determine an update to the parameters $\theta$ of the neural network.

After updating the parameters of the neural network, the training engine 520 can provide the updated parameter values 522 to the parameter store 530.

After training is completed, the training system 500 can output the final trained values 534 of the parameters of the neural network. In some implementations, the training system 500 can determine to complete training after processing a predetermined number of training examples. In some other implementations, the training system 500 can determine to complete training after a performance metric (e.g., prediction accuracy of a validation or testing data set) of the neural network exceeds a predetermined threshold. In some other implementations, the training system 500 can determine to complete training after an incremental improvement of the performance metric of the neural network across multiple training time steps drops below a predetermined threshold, i.e., after the performance of the neural network is no longer significantly improving.

For example, the training system 500 can provide the trained parameter values 534 to an inference system that is configured to receive input sequences and to process the input sequences using the trained neural network to generate network outputs. In some implementations, the inference system can be deployed on a local device of a user. In some implementations, the inference system can be deployed on a local device of a user. In some other implementations, the inference system can be deployed onto a cloud system, i.e., a distributed computing system having multiple computing nodes, e.g., hundreds or thousands of computing nodes, in one or more locations.

In some implementations, the neural network segments input sequences into blocks of the same block size B during both training and inference. As particular examples, the block size B can be 2, 4, 8, 16, or 32 during both training and inference. In some other implementations, the neural network can segment input sequences into blocks of different sizes during training and inference. As particular examples, the system can use block size B=8 during training but block size B=16 or 32 during inference, or block size B=4 during training but block size B=8 or 16 during inference.

In some implementations, the neural network can segment input sequences into blocks during training, but then not segment input sequences into blocks during inference. For example, during inference, the neural network can use a greedy top-k strategy, where the neural network selects the k arg max input tokens (as described above with reference to FIG. 4), regardless of the position of the tokens in the latent alignment. To ensure that the system generates a latent alignment in exactly B steps as during training, the neural network can choose k=|x|/B. In some such implementations, the neural network can disallow neighboring tokens from being selected in the same time step.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, .e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method of generating, from an input sequence having a respective input token at each of a plurality of input positions, an output sequence having a respective output token from a vocabulary of output tokens at each of a plurality of output positions, the method comprising:
  receiving the input sequence;
  determining a plurality of blocks, wherein each block comprises a plurality of consecutive input positions from the input positions;
  processing the input sequence using a neural network to generate a latent alignment of the input sequence, wherein the latent alignment comprises, at each of the input positions, either an output token from the vocabulary of output tokens or a blank token, the processing comprising, at each of a plurality of input time steps:
    receiving a partial latent alignment from a previous input time step, wherein the partial latent alignment comprises, at each of the input positions, one of: an output token, a blank token, or a mask token;
    selecting an input position in each block, wherein the token at the selected input position of the partial latent alignment in each block is a mask token; and
    processing i) the partial latent alignment and ii) the input sequence using the neural network to generate a new latent alignment, wherein the new latent alignment comprises, at the selected input position in each block, a output token or a blank token; and
  generating, using the latent alignment, the output sequence.

Embodiment 2 is the method of embodiment 1, wherein each block comprises a same number of input tokens, and wherein the same number of input tokens is equal to a number of input time steps.

Embodiment 3 is the method of any one of embodiments 1 or 2, wherein processing i) the partial latent alignment and ii) the input sequence using the neural network to generate a new latent alignment comprises:
 processing the partial latent alignment using an embedding subnetwork to generate a partial latent alignment embedding;
 processing the input sequence using a convolutional subnetwork to general an input sequence embedding;
 combining the partial latent alignment embedding and the input sequence embedding to generate a combined embedding; and
 processing the combined embedding using a self-attention subnetwork to generate the new latent alignment.

Embodiment 4 is the method of any one of embodiments 1-3, wherein the input tokens are audio samples and the output tokens are text samples.

Embodiment 5 is the method of any one of embodiments 1-4, wherein the neural network has been trained by updating parameters $\theta$ of the neural network using an objective function that marginalizes over all possible new partial latent alignments that are compatible with a particular partial latent alignment Embodiment 6 is the method of embodiment 5, wherein the objective function is:

$$J_{DP}(\theta) = E_{a \sim q_{\phi'}}\left[E_{\tilde{a} \sim r}\left[\log \sum_{a' \in \beta'(\tilde{a},a)} p_\theta(a' \mid \tilde{a}, x)\right]\right],$$

where x is the input sequence, a is a particular latent alignment, ã is a particular partial latent alignment of the latent alignment a, $\phi'$ is a pseudo-expert policy, $q_{\phi'}$ is a distribution over all possible latent alignments of x under the pseudo-expert policy $\phi'$, r(a) is a distribution over all possible masking permutations of latent alignments of x, and $\beta'(\tilde{a}, a)$ returns a set of all possible new partial latent alignments compatible with the particular partial latent alignment ã drawn from the distribution $q_{\phi'} \times r$.

Embodiment 7 is the method of any one of embodiments 1-4, wherein the neural network has been trained by updating parameters $\theta$ of the neural network using an objective function that computes a loss according to a pseudo-expert policy.

Embodiment 8 is the method of embodiment 7, wherein the objective function is:

$$J_{IM}(\theta) = E_{a \sim q_{\phi'}}[E_{\tilde{a} \sim r}[\log p_\theta(a \mid \tilde{a}, x)]],$$

where x is the input sequence, a is a particular latent alignment, ã is a particular partial latent alignment of the latent alignment a, $\phi'$ is a pseudo-expert policy, $q_{\phi'}$ is a distribution over all possible alignments of x under the pseudo-expert policy $\phi'$, and r(a) is a distribution over all possible masking permutations of alignments of x.

Embodiment 9 is the method of any one of embodiments 6 or 8, wherein $q_{\phi'} = \hat{a}^*_\phi + N$, where N is a noise distribution and $\hat{a}^*_\phi$ is a best empirical alignment under an expert policy $\phi$, $$\hat{a}^*_\phi = \mathrm{argmax}_a q_\phi(a \mid x, y),$$

where $q_\phi$ is a distribution over all possible alignments of x under the expert policy $\phi$.

Embodiment 10 is the method of embodiment 9, wherein $\hat{a}^*_\phi$ is computed using dynamic programming.

Embodiment 11 is the method of any one of embodiments 6 or 8, wherein $q_{\phi'} = q_{\theta'}$, where $q_{\theta'}$ is a stationary distribution created from a stale copy $\theta'$ of the parameters $\theta$ of the neural network.

Embodiment 12 is the method of any one of embodiments 5-11, wherein training the neural network comprises:
 sampling a particular latent alignment $a \sim q_{\phi'}$ for a particular input sequence x;
 sampling a particular partial latent alignment $\tilde{a} \sim r(a)$ by sampling a particular masking permutation from r and applying the particular masking permutation to a;
 processing the particular partial latent alignment ã and the particular input sequence x using the neural network to generate a prediction;
 computing the objective function;
 computing an error in the prediction using the computed objective function;
 backpropagating the error through the neural network to determine an update to the parameters $\theta$ of the neural network.

Embodiment 13 is the method of embodiment 12, wherein the objective function is computed using dynamic programming.

Embodiment 14 is the method of any one of embodiments 5-13, wherein r(a) is a Bernoulli or Uniform distribution.

Embodiment 15 is the method of any one of embodiments 1-14, wherein selecting an input position in each block comprises computing an arg max input position for each block in parallel across all blocks.

Embodiment 16 is the method of any one of embodiments 1-15, wherein selecting an input position in each block comprises:
 at each of a plurality of non-final input time steps, selecting an input position such that i) the token at the selected input position in the partial latent alignment is a mask token and ii) the selected input position is not the final input position in the block; and
 at a final input time step, selecting the final input position in the block.

Embodiment 17 is the method of any one of embodiments 1-15, wherein selecting, at each of a plurality of time steps, an input position in each block comprises alternating between i) selecting an input position in each block that is in a first sub-block of the block and ii) selecting an input position in each block that is in a second sub-block of the block.

Embodiment 18 is a method of generating, from an input sequence having a respective input token at each of a plurality of input positions, an output sequence having a respective output token from a vocabulary of output tokens at each of a plurality of output positions, the method comprising:
 receiving the input sequence;
 determining a plurality of blocks, wherein each block comprises a plurality of consecutive input positions from the input positions;
 processing the input sequence using a neural network to generate a latent alignment of the input sequence, wherein the latent alignment comprises, at each of the input positions, either an output token from the vocabulary of output tokens or a blank token, the processing comprising, at each of a plurality of input time steps:

receiving a partial latent alignment from a previous input time step, wherein the partial latent alignment comprises, at each of the input positions, one of: an output token, a blank token, or a mask token;

selecting an input position in each block, wherein the token at the selected input position of the partial latent alignment in each block is a mask token; and processing i) the partial latent alignment and ii) the input sequence using the neural network to generate a new latent alignment, wherein the new latent alignment comprises, at the selected input position in each block, a output token or a blank token; and generating, using the latent alignment, the output sequence.

Embodiment 19 is the method of embodiment 18, wherein each block comprises a same number of input tokens, and wherein the same number of input tokens is equal to a number of input time steps.

Embodiment 20 is the method of any one of embodiments 18 or 19, wherein processing i) the partial latent alignment and ii) the input sequence using the neural network to generate a new latent alignment comprises:

processing the input sequence using a first embedding subnetwork to generate an input sequence embedding;

processing the partial latent alignment using a second embedding subnetwork to generate a partial latent alignment embedding;

combining the partial latent alignment embedding and the input sequence embedding to generate a combined embedding; and processing the combined embedding using a self-attention subnetwork to generate the new latent alignment.

Embodiment 21 is the method of any one of embodiments 18-20, wherein the input tokens are audio samples and the output tokens are text samples.

Embodiment 22 is the method of any one of embodiments 18-20, wherein the input tokens are text samples in a first language and the output tokens are text samples in a second language.

Embodiment 23 is the method of any one of embodiments 18-22, wherein processing i) the partial latent alignment and ii) the input sequence using the neural network to generate a new latent alignment comprises:

upsampling the input sequence to generate a modified input sequence; and processing i) the partial latent alignment and ii) the modified input sequence using the neural network to generate the new latent alignment.

Embodiment 24 is the method of any one of embodiments 18-23, wherein the neural network has been trained by updating parameters $\theta$ of the neural network using an objective function that marginalizes over all possible new partial latent alignments that are compatible with a particular partial latent alignment Embodiment 25 is the method of embodiments 24, wherein the objective function is:

$$J_{DP}(\theta) = E_{a \sim q_{\phi'}}\left[E_{\tilde{a} \sim r}\left[\log \sum_{a' \in \beta'(\tilde{a},a)} p_{\theta}(a' \mid \tilde{a}, x)\right]\right],$$

where x is the input sequence, a is a particular latent alignment, ã is a particular partial latent alignment of the latent alignment a, $\phi'$ is a pseudo-expert policy, $q_{\phi'}$ is a distribution over all possible latent alignments of x under the pseudo-expert policy $\phi'$, r(a) is a distribution over all possible masking permutations of latent alignments of x, and $\beta'(\tilde{a}, a)$ returns a set of all possible new partial latent alignments compatible with the particular partial latent alignment ã drawn from the distribution $q_{\phi'} \times r$.

Embodiment 26, is the method of any one of embodiments 18-23, wherein the neural network has been trained by updating parameters $\theta$ of the neural network using an objective function that computes a loss according to a pseudo-expert policy.

Embodiment 27 is the method of embodiment 26, wherein the objective function is:

$$J_{IM}(\theta) = E_{a \sim q_{\phi'}}[E_{\tilde{a} \sim r}[\log p_{\theta}(a \mid \tilde{a}, x)]],$$

where x is the input sequence, a is a particular latent alignment, ã is a particular partial latent alignment of the latent alignment a, $\phi'$ is a pseudo-expert policy, $q_{\phi'}$ is a distribution over all possible alignments of x under the pseudo-expert policy $\phi'$, and r(a) is a distribution over all possible masking permutations of alignments of x.

Embodiment 28 is the method of any one of embodiments 25, or 27, wherein $q_{\phi'} = \hat{a}^*_{\phi} + N$, where N is a noise distribution and $\hat{a}^*_{\phi}$ is a best empirical alignment under an expert policy $\phi$, $$\hat{a}^*_{\phi} = \underset{a}{\mathrm{argmax}}\, q_{\phi}(a \mid x, y),$$

where $q_{\phi}$ is a distribution over all possible alignments of x under the expert policy $\phi$.

Embodiment 29 is the method of embodiment 28, wherein $\hat{a}^*_{\phi}$ is computed using dynamic programming.

Embodiment 30 is the method of any one of embodiments 25 or 27, wherein $q_{\phi'} = q_{\theta'}$, where $q_{\theta'}$ is a stationary distribution created from a stale copy $\theta'$ of the parameters $\theta$ of the neural network.

Embodiment 31 is the method of any one of embodiments 24-30, wherein training the neural network comprises:

sampling a particular latent alignment $a \sim q_{\phi'}$ for a particular input sequence x;

sampling a particular partial latent alignment $\tilde{a} \sim r(a)$ by sampling a particular masking permutation from r and applying the particular masking permutation to a;

processing the particular partial latent alignment ã and the particular input sequence x using the neural network to generate a prediction;

computing the objective function;

computing an error in the prediction using the computed objective function;

backpropagating the error through the neural network to determine an update to the parameters $\theta$ of the neural network.

Embodiment 32 is the method of embodiment 31, wherein the objective function is computed using dynamic programming.

Embodiment 33 is the method of any one of embodiments 24-32, wherein r(a) is a Bernoulli or Uniform distribution.

Embodiment 34 is the method of any one of embodiments 18-33, wherein selecting an input position in each block comprises computing an arg max input position for each block in parallel across all blocks.

Embodiment 35 is the method of any one of embodiments 18-34, wherein selecting an input position in each block comprises:

at each of a plurality of non-final input time steps, selecting an input position such that i) the token at the selected input position in the partial latent alignment is a mask token and ii) the selected input position is not the final input position in the block; and at a final input time step, selecting the final input position in the block.

Embodiment 36 is the method of any one of embodiments 18-34, wherein selecting, at each of a plurality of time steps, an input position in each block comprises alternating between i) selecting an input position in each block that is in a first sub-block of the block and ii) selecting an input position in each block that is in a second sub-block of the block.

Embodiment 37 is a system comprising: one or more computers and one or more storage devices storing instructions that are operable, when executed by the one or more computers, to cause the one or more computers to perform the method of any one of embodiments 1 to 36.

Embodiment 38 is a computer storage medium encoded with a computer program, the program comprising instructions that are operable, when executed by data processing apparatus, to cause the data processing apparatus to perform the method of any one of embodiments 1 to 36.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of generating, from an input sequence having a respective input token at each of a plurality of input positions, an output sequence having a respective output token from a vocabulary of output tokens at each of a plurality of output positions, the method comprising:
receiving the input sequence;
determining a plurality of blocks, wherein each block comprises a plurality of input tokens having consecutive input positions from the input positions, wherein the input tokens comprise a first token modality associated with audio tokens, text tokens, or image tokens;
processing the input sequence using a neural network to generate a latent alignment of the input sequence, wherein the latent alignment comprises, at each of the input positions, either an output token from the vocabulary of output tokens or a blank token, the processing comprising, at each of a plurality of input time steps:
receiving a partial latent alignment from a previous input time step, wherein the partial latent alignment comprises, at each of the input positions, one of: an output token, a blank token, or a mask token;
selecting an input position in each block, wherein the token at the selected input position of the partial latent alignment in each block is a mask token; and
processing i) the partial latent alignment and ii) the input sequence using the neural network to generate a new latent alignment, wherein the new latent alignment comprises, at the selected input position in each block, an output token or a blank token; and
generating, using the latent alignment, the output sequence, wherein the output tokens comprise a second token modality associated with audio tokens, text tokens, or image tokens.

2. The method of claim 1, wherein each block comprises a same number of input tokens, and wherein the same number of input tokens is equal to a number of input time steps.

3. The method of claim 1, wherein processing i) the partial latent alignment and ii) the input sequence using the neural network to generate a new latent alignment comprises:
processing the input sequence using a first embedding subnetwork to generate an input sequence embedding;
processing the partial latent alignment using a second embedding subnetwork to generate a partial latent alignment embedding;
combining the partial latent alignment embedding and the input sequence embedding to generate a combined embedding; and
processing the combined embedding using a self-attention subnetwork to generate the new latent alignment.

4. The method of claim 1, wherein the first token modality is an audio token modality comprising audio sample tokens and the second token modality is a text token modality comprising text sample tokens.

5. The method of claim 1, wherein the first token modality is a text token modality comprising text sample in a first language and the second token modality is a text token modality comprising text sample in a second language.

6. The method of claim 1, wherein processing i) the partial latent alignment and ii) the input sequence using the neural network to generate a new latent alignment comprises:
upsampling the input sequence to generate a modified input sequence; and
processing i) the partial latent alignment and ii) the modified input sequence using the neural network to generate the new latent alignment.

7. The method of claim 1, wherein the neural network has been trained by updating parameters $\theta$ of the neural network using an objective function that marginalizes over all possible new partial latent alignments that are compatible with a particular partial latent alignment.

8. The method of claim 7, wherein the objective function is:

$$J_{DP}(\theta)=E_{a\sim q_{\phi'}}[E_{\tilde{a}\sim r}[\log \Sigma_{a'\in\beta'(\tilde{a},\ a)}p_\theta(a'|\tilde{a},\ x)]],$$

where x is the input sequence, a is a particular latent alignment, ã is a particular partial latent alignment of the latent alignment a, ϕ' is a pseudo-expert policy, $q_{\phi'}$ is a distribution over all possible latent alignments of x under the pseudo-expert policy ϕ', r(a) is a distribution over all possible masking permutations of latent alignments of x, and β'(ã, a) returns a set of all possible new partial latent alignments compatible with the particular partial latent alignment ã drawn from the distribution $q_{\phi'}\times r$.

9. The method of claim 1, wherein the neural network has been trained by updating parameters θ of the neural network using an objective function that computes a loss according to a pseudo-expert policy.

10. The method of claim 9, wherein the objective function is:

$$J_{IM}(\theta)=E_{a\sim q_{\phi'}}[E_{\tilde{a}\sim r}[\log p_\theta(a|\tilde{a},\ x)]],$$

where x is the input sequence, a is a particular latent alignment, ã is a particular partial latent alignment of the latent alignment a, ϕ' is a pseudo-expert policy, $q_{\phi'}$ is a distribution over all possible alignments of x under the pseudo-expert policy ϕ', and r(a) is a distribution over all possible masking permutations of alignments of x.

11. The method of claim 8, wherein $q_{\phi'}=\hat{a}^*_\phi+N$, where N is a noise distribution and $\hat{a}^*_\phi$ is a best empirical alignment under an expert policy ϕ, $$\hat{a}^*_\phi = \mathrm{argmax}_a q_\phi(a\mid x,\ y),$$

where $q_\phi$ is a distribution over all possible alignments of x under the expert policy ϕ.

12. The method of claim 11, wherein $\hat{a}^*_\phi$ is computed using dynamic programming.

13. The method of claim 8, wherein $q_{\phi'}=q_{\theta'}$, where $q_{\theta'}$ is a stationary distribution created from a stale copy θ' of the parameters θ of the neural network.

14. The method of claim 7, wherein training the neural network comprises:
sampling a particular latent alignment $a\sim q_{\phi'}$ for a particular input sequence x;
sampling a particular partial latent alignment ã~r(a) by sampling a particular masking permutation from r and applying the particular masking permutation to a;
processing the particular partial latent alignment ã and the particular input sequence x using the neural network to generate a prediction;
computing the objective function;
computing an error in the prediction using the computed objective function;
backpropagating the error through the neural network to determine an update to the parameters θ of the neural network.

15. The method of claim 14, wherein the objective function is computed using dynamic programming.

16. The method of claim 7, wherein r(a) is a Bernoulli or Uniform distribution.

17. The method of claim 1, wherein selecting an input position in each block comprises computing an arg max input position for each block in parallel across all blocks.

18. The method of claim 1, wherein selecting an input position in each block comprises:
at each of a plurality of non-final input time steps, selecting an input position such that i) the token at the selected input position in the partial latent alignment is a mask token and ii) the selected input position is not the final input position in the block; and
at a final input time step, selecting the final input position in the block.

19. The method of claim 1, wherein selecting, at each of a plurality of time steps, an input position in each block comprises alternating between i) selecting an input position in each block that is in a first sub-block of the block and ii) selecting an input position in each block that is in a second sub-block of the block.

20. The method of claim 1, wherein the second token modality is the first token modality.

21. The method of claim 4, further comprising:
receiving one or more audio samples by way of a mobile device; and
generating corresponding audio sample tokens using the audio samples.

22. A system comprising one or more computers and one or more storage devices storing instructions that when executed by the one or more computers cause the one or more computers to perform operations for generating, from an input sequence having a respective input token at each of a plurality of input positions, an output sequence having a respective output token from a vocabulary of output tokens at each of a plurality of output positions, the method comprising:
receiving the input sequence;
determining a plurality of blocks, wherein each block comprises a plurality of input tokens having consecutive input positions from the input positions, wherein the input tokens comprise a first token modality associated with audio tokens, text tokens, or image tokens;
processing the input sequence using a neural network to generate a latent alignment of the input sequence, wherein the latent alignment comprises, at each of the input positions, either one of an output token from the vocabulary of output tokens or a blank token the processing comprising, at each of a plurality of input time steps:
receiving a partial latent alignment from a previous input time step, wherein the partial latent alignment comprises, at each of the input positions, one of: an output token, a blank token, or a mask token;
selecting an input position in each block, wherein the token at the selected input position of the partial latent alignment in each block is a mask token; and
processing i) the partial latent alignment and ii) the input sequence using the neural network to generate a new latent alignment, wherein the new latent alignment comprises, at the selected input position in each block, an output token or a blank token; and
generating, using the latent alignment, the output sequence, wherein the output tokens comprise a second token modality associated with audio tokens, text tokens, or image tokens.

23. One or more non-transitory computer-readable storage media storing instructions that when executed by one or more computers cause the one or more computers to perform operations for generating, from an input sequence having a respective input token at each of a plurality of input positions, an output sequence having a respective output token from a vocabulary of output tokens at each of a plurality of output positions, the method comprising:

receiving the input sequence;

determining a plurality of blocks, wherein each block comprises a plurality of input tokens having consecutive input positions from the input positions, wherein the input tokens comprise a first token modality associated with audio tokens, text tokens, or image tokens;

processing the input sequence using a neural network to generate a latent alignment of the input sequence, wherein the latent alignment comprises, at each of the input positions, either one of an output token from the vocabulary of output tokens or a blank token the processing comprising, at each of a plurality of input time steps:

receiving a partial latent alignment from a previous input time step, wherein the partial latent alignment comprises, at each of the input positions, one of: an output token, a blank token, or a mask token;

selecting an input position in each block, wherein the token at the selected input position of the partial latent alignment in each block is a mask token; and processing i) the partial latent alignment and ii) the input sequence using the neural network to generate a new latent alignment, wherein the new latent alignment comprises, at the selected input position in each block, an output token or a blank token; and generating, using the latent alignment, the output sequence, wherein the output tokens comprise a second token modality associated with audio tokens, text tokens, or image tokens.

* * * * *